(12) United States Patent
Lee et al.

(10) Patent No.: US 12,417,143 B2
(45) Date of Patent: Sep. 16, 2025

(54) MEMORY SYSTEM, METHOD OF OPERATING THE SAME, AND ELECTRONIC SYSTEM INCLUDING THE SAME

(71) Applicant: SAMSUNG ELECTRONICS CO., LTD., Suwon-si (KR)

(72) Inventors: Myungkyu Lee, Suwon-si (KR); Seongmuk Kang, Suwon-si (KR); Daehyun Kim, Suwon-si (KR); Jiho Kim, Suwon-si (KR); Kyomin Sohn, Suwon-si (KR); Kijun Lee, Suwon-si (KR); Sunghye Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 8 days.

(21) Appl. No.: 18/543,737

(22) Filed: Dec. 18, 2023

(65) Prior Publication Data
US 2024/0385925 A1 Nov. 21, 2024

(30) Foreign Application Priority Data
May 17, 2023 (KR) ........................ 10-2023-0063853

(51) Int. Cl.
*G06F 11/10* (2006.01)
*G06F 11/00* (2006.01)
*G06F 11/07* (2006.01)

(52) U.S. Cl.
CPC ........ *G06F 11/1064* (2013.01); *G06F 11/008* (2013.01); *G06F 11/076* (2013.01)

(58) Field of Classification Search
None
See application file for complete search history.

(56) References Cited

U.S. PATENT DOCUMENTS

| 9,542,268 B2 | 1/2017 | Chen et al. |
| 9,910,728 B2 | 3/2018 | Das et al. |
| 11,170,869 B1 | 11/2021 | Helmick et al. |
| 11,321,171 B1* | 5/2022 | Agarwal ............. G06F 12/0897 |

(Continued)

OTHER PUBLICATIONS

Luo et al., "Using ECC DRAM to Adaptively Increase Memory Capacity", Jun. 28, 2017, arXiv:1706.08870v2 (Year: 2017).*

(Continued)

*Primary Examiner* — Daniel F. McMahon
(74) *Attorney, Agent, or Firm* — Sughrue Mion, PLLC

(57) ABSTRACT

A memory system includes a plurality of volatile memory devices and a memory controller. The memory controller causes different amounts of error correction parity information to be generated depending on a request from a host device and depending on failed memory cell counts. The memory controller includes an error correction level (ECL) manager configured to receive cache line data from the host device through the host interface, and output an error correction code (ECC) control signal indicating one of a first correction level and a second correction level. The correction levels are based on cell reliability information and data reliability request information. The data reliability request information is associated with the cache line data. An ECC engine generates first parity symbols associated with the cache line data, and may, depending on the ECC control signal, generate additional parity symbols.

20 Claims, 23 Drawing Sheets

(56) References Cited

U.S. PATENT DOCUMENTS

| | | | |
|---|---|---|---|
| 2015/0333773 A1 | 11/2015 | Fillingim et al. | |
| 2019/0042358 A1 | 2/2019 | Criss et al. | |
| 2021/0278998 A1* | 9/2021 | Li | G06F 12/0246 |
| 2021/0311646 A1* | 10/2021 | Malladi | G06F 3/0647 |
| 2022/0006653 A1* | 1/2022 | Ghetie | H04L 9/002 |
| 2022/0179736 A1 | 6/2022 | Sforzin et al. | |
| 2022/0237077 A1* | 7/2022 | Brewer | G06F 11/1048 |
| 2022/0261363 A1* | 8/2022 | Confalonieri | G06F 13/1694 |
| 2023/0020131 A1* | 1/2023 | Agarwal | G06F 3/0679 |
| 2023/0096375 A1* | 3/2023 | Confalonieri | G06F 11/10 |
| | | | 711/154 |
| 2023/0236933 A1* | 7/2023 | Thirumala | G06F 11/1004 |
| | | | 714/6.24 |
| 2023/0393940 A1* | 12/2023 | Del Gatto | G06F 11/1096 |
| 2024/0004759 A1* | 1/2024 | Sforzin | G06F 11/1076 |
| 2024/0007265 A1* | 1/2024 | Amato | H04L 9/32 |

OTHER PUBLICATIONS

Supermicr, "Memory RAS Configuration," User's Guide Revision 1.0, Dec. 22, 2017, Total 17 pages.

* cited by examiner

FIG. 6D

CRI

| Cacheline Index | Degree of Cell Reliability (DCR) |
|---|---|
| CCL1 | H → L |
| CCL2 | H |
| CCL3 | H |
| ⋮ | ⋮ |

FIG. 6E

ECLI-1

| DCR | ECTL | # of parity symbols | # of correctable error symbols |
|---|---|---|---|
| L | CL2 | q (> p) | M (> L) |
| H | CL1 | p | L |

FIG. 7D

DRRI

| Cashline Index | Degree of Data Integrity (DDITG) |
|---|---|
| CCL1 | L |
| CCL2 | L → H |
| CCL3 | L → H → L |
| ⋮ | ⋮ |

FIG. 7E

ECLI-2

| DDITG | ECTL | # of parity symbols | # of correctable error symbols |
|---|---|---|---|
| H | CL2 | q (> p) | M (> L) |
| L | CL1 | p | L |

ECLI-3

| DCR | DDITG | ECTL | # of parity symbols | # of correctable error symbols |
|---|---|---|---|---|
| L | H | CL2 | | |
| H | H | CL2 | $q (> p)$ | $M (> L)$ |
| L | L | CL2 | | |
| H | L | CL1 | $p$ | $L$ |

FIG. 15B

ECLI-4

| DCR | ECTL | # of parity symbols | # of correctable error symbols |
|-----|------|---------------------|-------------------------------|
| L3  | CL4  | s (> r)             | O (> N)                       |
| L2  | CL3  | r (> q)             | N (> M)                       |
| L1  | CL2  | q (> p)             | M (> L)                       |
| H   | CL1  | p                   | L                             |

FIG. 16

ECCI

| ECTL | # of parity symbols | # of correctable error symbols |
|---|---|---|
| CL1 | GMTRXa | CMTRXa |
| CL2 | GMTRXb | CMTRXb |
| CL3 | GMTRXc | CMTRXc |
| CL4 | GMTRXd | CMTRXd |
| CL5 | GMTRXe | CMTRXe |
| CL6 | GMTRXf | CMTRXf |
| ⋮ | ⋮ | ⋮ |

FIG. 17

CRI-2

| Cacheline Index | Degree of Cell Reliability (DCR) | Cell Error Location (CEL) |
|---|---|---|
| CCL1 | H → L1 | CEL1 |
| CCL2 | H → L1 → L2 → L3 | CEL2 |
| CCL3 | H → L1 → L2 | CEL3 |
| ⋮ | ⋮ | ⋮ | ated with the cache line data based on at least one of cell reliability information and data reliability request information which are associated with the cache line data; based on the error correction level indicating a first correction level, generating first parity symbols associated with the cache line data; based on the error correction level indicating a second correction level, generating second parity symbols including additional parity symbols; and writing a codeword including the cache line data and either the first parity symbols or the second parity symbols in a plurality of volatile memory devices.

According to an aspect of an embodiment, an electronic system includes: a host device; and a memory system including a plurality of volatile memory devices and a memory controller configured to control the plurality of volatile memory devices and communicate with the host device based on a Compute eXpress Link (CXL) communication protocol, wherein the memory controller is configured to: receive cache line data from the host device through a CXL interface, determine an error correction level associated with the cache line data based on at least one of cell reliability information and data reliability request information, based on the error correction level indicating a first correction level, generate first parity symbols associated with the cache line data, write the cache line data in a first storage region, and write the first parity symbols in a second storage region, and based on the error correction level indicating a second correction level, generate additional parity symbols, write the cache line data in the first storage region, write the first parity symbols in the second storage region, and write the additional parity symbols in a third storage region.

MEMORY SYSTEM, METHOD OF OPERATING THE SAME, AND ELECTRONIC SYSTEM INCLUDING THE SAME

CROSS-REFERENCE TO RELATED APPLICATIONS

This application claims priority under 35 U.S.C. § 119 to Korean Patent Application No. 10-2023-0063853 filed on May 17, 2023, in the Korean Intellectual Property Office, the disclosure of which is incorporated by reference herein in its entirety.

BACKGROUND

The present disclosure relates to a semiconductor device, and more particularly, to a memory system, an operating method of the memory system, and an electronic system including the memory system.

A volatile memory device loses data stored therein when a power is turned off but supports a fast speed compared to a nonvolatile memory device. The volatile memory device includes a dynamic random access memory (DRAM), a static RAM (SRAM), a synchronous DRAM (SDRAM), etc.

As the degree of integration of a semiconductor chip included in a memory system increases, an error of a memory cell unit is increasing in volatile memory devices constituting a memory module. To address this issue, there is needed a technique for efficiently correcting an error while maintaining the performance of the memory module.

SUMMARY

One or more embodiments of the present disclosure provide a memory system capable of efficiently correcting an error while maintaining the performance of a memory module.

Further, one or more embodiments of the present disclosure provide an operating method of the memory system.

Further still, one or more embodiments of the present disclosure provide an electronic system including the memory system.

According to an aspect of an embodiment, a memory system includes: a plurality of volatile memory devices; and a memory controller configured to control the plurality of volatile memory devices, wherein the memory controller includes: a host interface configured to communicate with a host device based on a Compute eXpress Link (CXL) communication protocol; an error correction level (ECL) manager configured to receive cache line data from the host device through the host interface, and output an error correction code (ECC) control signal indicating one of a first correction level and a second correction level being error correction levels based on cell reliability information and data reliability request information which are associated with the cache line data; and an ECC engine configured to generate first parity symbols associated with the cache line data based on the ECC control signal indicating the first correction level, and generate additional parity symbols based on the ECC control signal indicating the second correction level.

According to an aspect of an embodiment, a method of operating a memory system, includes: receiving cache line data from a host device based on a Compute eXpress Link (CXL) communication protocol; determining an error correction level associated with the cache line data based on at

BRIEF DESCRIPTION OF THE FIGURES

The above and other aspects and features of the present disclosure will become apparent by describing in detail embodiments thereof with reference to the accompanying drawings, in which:

FIGS. 6A, 6B, 6C, 6D, and 6E are diagrams for describing an embodiment of the process of determining an error correction level of FIGS. 1 and 2;

FIGS. 7A, 7B, 7C, 7D, and 7E are diagrams for describing an embodiment of the process of determining an error correction level of FIGS. 1 and 2;

FIGS. 15A and 15B are diagrams for describing an embodiment of the process of determining an error correction level, which is described with reference to FIGS. 1 and 2;

FIG. 16 is a diagram illustrating an example of generation matrices and check matrices used in an ECC engine of FIG. 4;

FIG. 17 is a diagram for describing another example of cell reliability information of FIGS. 6D and 15A;

DETAILED DESCRIPTION

Below, example embodiments of the present disclosure will be described in detail with reference to the drawings.

Figure 1:
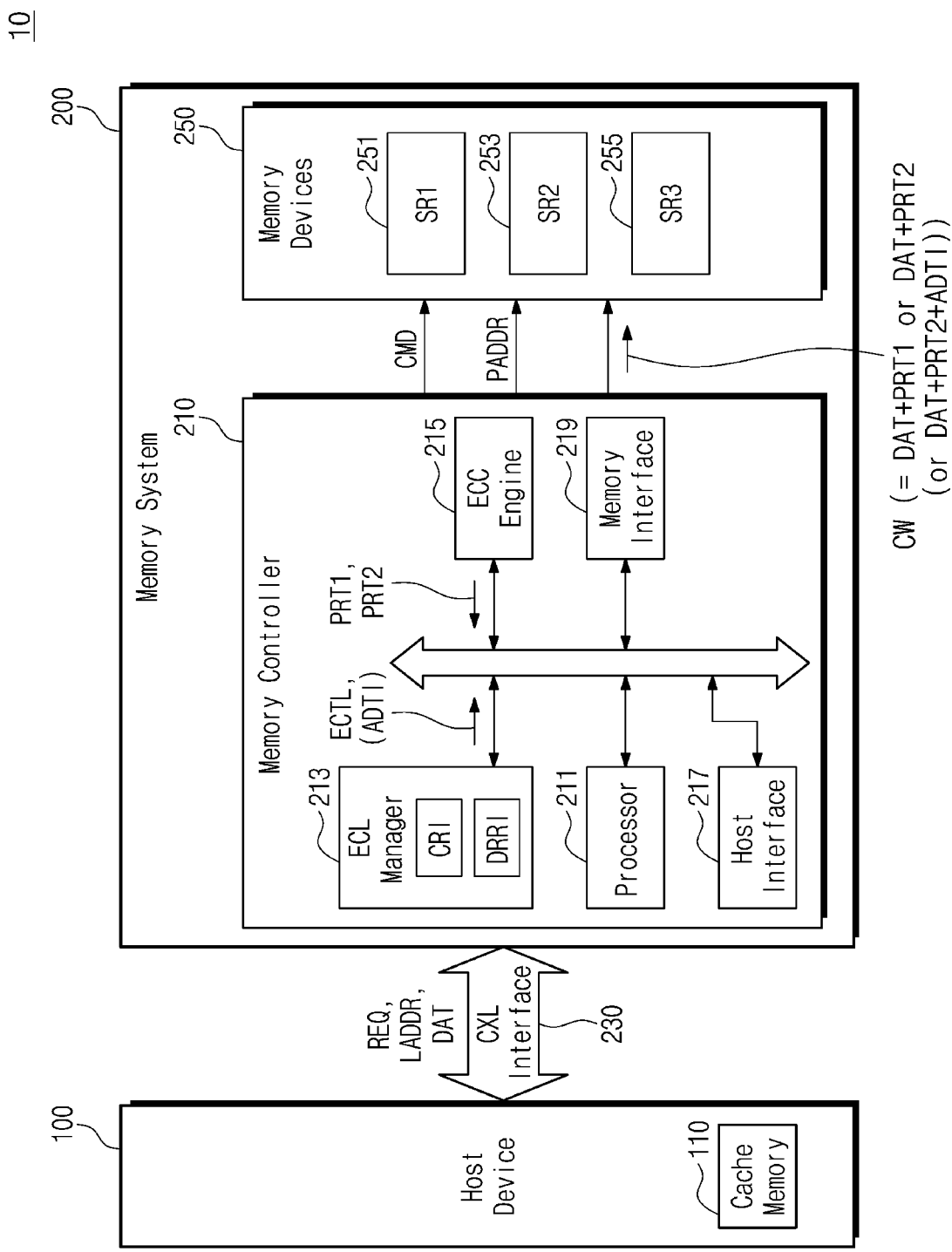
FIG. 1 is a block diagram illustrating an electronic system including a memory system according to an embodiment of the present disclosure.

FIG. 1 is a block diagram illustrating an electronic system including a memory system according to an embodiment of the present disclosure.

Referring to FIG. 1, an electronic system 10 may include a host device 100 and a memory system 200. The host device 100 may transmit, via a CXL interface 230, a request REQ, a logical address LADDR, and data DAT corresponding to the request REQ to the memory system 200, and the memory system 200 may operate based on the request REQ, the logical address LADDR, and the data DAT. The host device 100 may include a cache memory 110 and may store data, which are frequently accessed, in the cache memory 110.

The memory system 200 may include a memory controller 210 and a plurality of volatile memory devices 250. The memory controller 210 may control the plurality of volatile memory devices 250. For example, the memory controller 210 may translate the request REQ and the logical address LADDR to generate a command CMD and a physical address PADDR, may encode the data DAT to generate a codeword CW, and may transmit the command CMD, the physical address PADDR, and the codeword CW to the plurality of volatile memory devices 250.

In an embodiment, when the request REQ is a write request, the memory controller 210 may receive the data DAT corresponding to the write request from the host device 100 through a host interface 217. In this case, the data DAT may be present in the cache memory 110 and may be referred to as a "cache line data".

The memory controller 210 may include a processor 211, an error correction level (ECL) manager 213, an error correction code (ECC) engine 215, a host interface 217, and a memory interface 219.

The processor 211 may overall control the components 213, 215, 217, and 219 included in the memory controller 210, and the memory controller 210 may communicate with the host device 100 through the host interface 217 and may communicate with the plurality of volatile memory devices 250 through the memory interface 219.

The ECL manager 213 may output an ECC control signal ECTL to the ECC engine 215 based on one or more of cell reliability information CRI associated with the cache line data and data reliability request information DRRI.

In an embodiment, the cell reliability information CRI may include the degree of cell reliability associated with the cache line data and target memory cells. The target memory cells may be included in the plurality of volatile memory devices 250 and may indicate memory cells to be accessed with regard to the cache line data. The degree of cell reliability may indicate the memory cell' capability to retain data while minimizing an error capable of occurring in the stored data and may be expressed by one of a plurality of cell reliability levels to be described with reference to FIGS. 4, 6A, 11A, and 15A.

In an embodiment, the data reliability request information DRRI may include the degree of data integrity associated with the cache line data and requested by the host device 100. The degree of data integrity may indicate correctness and consistency of data requested by the host device 100 and may be expressed by one of a plurality of data reliability request levels to be described with reference to FIGS. 4, 7A, and 11A.

In an embodiment, the ECL manager 213 may determine an error correction level associated with the cache line data based on one or more of the cell reliability information CRI and the data reliability request information DRRI. The ECC control signal ECTL may indicate the error correction level, and the error correction level may include one of a first correction level and a second correction level. However, this is provided only as an example. How to determine the error correction level will be described with reference to FIGS. 6A, 6B, 7A, 7B, 11A, and 11B.

The ECC engine 215 may generate one of first parity symbols PRT1 and second parity symbols PRT2 associated with the cache line data based on the ECC control signal ECTL.

In an embodiment, when the ECC control signal ECTL indicates the first correction level, the ECC engine 215 may generate the first parity symbols PRT1. When the ECC control signal ECTL indicates the second correction level, the ECC engine 215 may generate the second parity symbols PRT2.

In an embodiment, the second parity symbols PRT2 may include the first parity symbols PRT1 and additional parity symbols. For example, when the ECC control signal ECTL indicates the first correction level, the ECC engine 215 may generate the first parity symbols PRT1; when the ECC control signal ECTL indicates the second correction level, the ECC engine 215 may further generate the additional parity symbols.

The plurality of volatile memory devices 250 may include a first storage region (SR1) 251, a second storage region (SR2) 253, and a third storage region (SR3) 255.

When the ECC control signal ECTL indicates the first correction level, the processor 211 may write the codeword CW, which includes the cache line data and the first parity symbols PRT1, in the first and second storage regions 251 and 253; when the ECC control signal ECTL indicates the second correction level, the processor 211 may write the codeword CW, which includes the cache line data and the second parity symbols PRT2, in the first to third storage regions 251, 253, and 255. In an embodiment, the processor 211 may write the cache line data in the first storage region 251, may write the first parity symbols PRT1 in the second storage region 253, and may write the additional parity symbols among the second parity symbols PRT2 in the third storage region 255.

In the electronic system 10 including the memory system 200 according to an embodiment of the present disclosure, the ECC engine 215 may adopt a Reed-Solomon (RS) code theory capable of correcting multi-error bits by a symbol unit for the purpose of providing the strong error correction capability. The ECC engine 215 may generate one of the first and second parity symbols PRT1 and PRT2 based on the RS code theory to use parity symbols generated in the process of performing RS decoding and may increase the number (or length) of parity symbols to provide the error correction capability capable of correcting more error symbols.

In an embodiment, the number of second parity symbols PRT2 may be more than the number of first parity symbols PRT1, and the error correction capability that is provided by the second correction level corresponding to the second parity symbols PRT2 may be higher than the error correction capability that is provided by the first correction level corresponding to the first parity symbols PRT1. For example, each of the plurality of volatile memory devices 250 may be referred to as a "chip (or die)", the number of first parity symbols PRT1 may be set to have a value great enough to correct (e.g., "chipkill") all the error symbols present in a codeword that the host device 100 is capable of reading from one chip through one access, and the number of second parity symbols PRT2 may be set to have a value great enough to additionally correct errors of two or more symbols (e.g., multi-symbols) by supplementing the first correction level; however, each of the number of first parity symbols PRT1 generated by the memory system 200 and the number of second parity symbols PRT2 generated by the memory system 200 may be variously changed or modified. Generally, chipkill refers to correction of one or two symbol errors per DRAM access (also referred to as a DRAM beat).

In an embodiment, each of the number of first parity symbols PRT1 (or the error correction capability by PRT1) and the number of second parity symbols PRT2 (or the error correction capability by PRT2) may be variously changed or modified based on an allowable decoding time range capable of being set depending on a communication scheme (or a configuration scheme) between the host device 100 and the memory system 200. As will be described with reference to FIG. 3, the allowable decoding time range may be longer than a time that is permitted in a conventional electronic system to decode an arbitrary codeword.

In the electronic system 10 including the memory system 200 according to an embodiment of the present disclosure, the host device 100 and the memory system 200 may adopt a communication scheme that is in advance set to provide the error correction capability implemented by the first and second parity symbols PRT1 and PRT2.

In an embodiment, the communication scheme may include a CXL (Compute eXpress Link) communication protocol being an interface for efficiently utilizing a high-performance computing system, and the memory system 200 may communicate with the host device 100 by using the host interface 217. In this case, the host device 100 may use the plurality of volatile memory devices 250 of the memory system 200 as (or like) a main memory of the host device 100, based on the CXL communication protocol. The plurality of volatile memory devices 250 may be implemented only with a dynamic random access memory (DRAM); in this case, the plurality of volatile memory devices 250 may be referred to as a "CXL DRAM". However, the present disclosure is not limited thereto. Some of the plurality of volatile memory devices 250 may be implemented with a static random access memory (SRAM).

In an embodiment, the memory controller 210 may adopt the communication protocol complying with the standard such as DDR3, DDR4, DDR5, LPDDR3, LPDDR4, LPDDR5, WIO2, HBM, WIO3, or HBM2 and may communicate with the plurality of volatile memory devices 250.

In an embodiment, the ECL manager 213 may further output additional information ADTI, and the additional information ADTI may be included in the codeword CW so as to be stored in the plurality of volatile memory devices 250. The additional information ADTI may include a cell error location that is capable of being used in the process of performing RS decoding on the codeword CW. The cell error location will be described with reference to FIGS. 4, 17, and 18.

Through the above configuration, a memory system according to an embodiment of the present disclosure may communicate with a host device based on the preset communication scheme and may set the allowable decoding time range based on the communication scheme. The allowable decoding time range may be longer than a time that is permitted in a conventional electronic system for codeword decoding, and the memory system may provide the error correction capability of "chipkill+multi-symbol" or more by performing RS decoding providing the capability to correct an error(s) of multi-symbols within the allowable decoding time range.

The memory system may variously generate parity symbols for RS encoding or RS decoding based on one or more of cell reliability information and data reliability request information. The memory system may provide the error correction capability capable of efficiently correcting an error by using parity symbols while maintaining the performance of a plurality of volatile memory devices.

Figure 2:
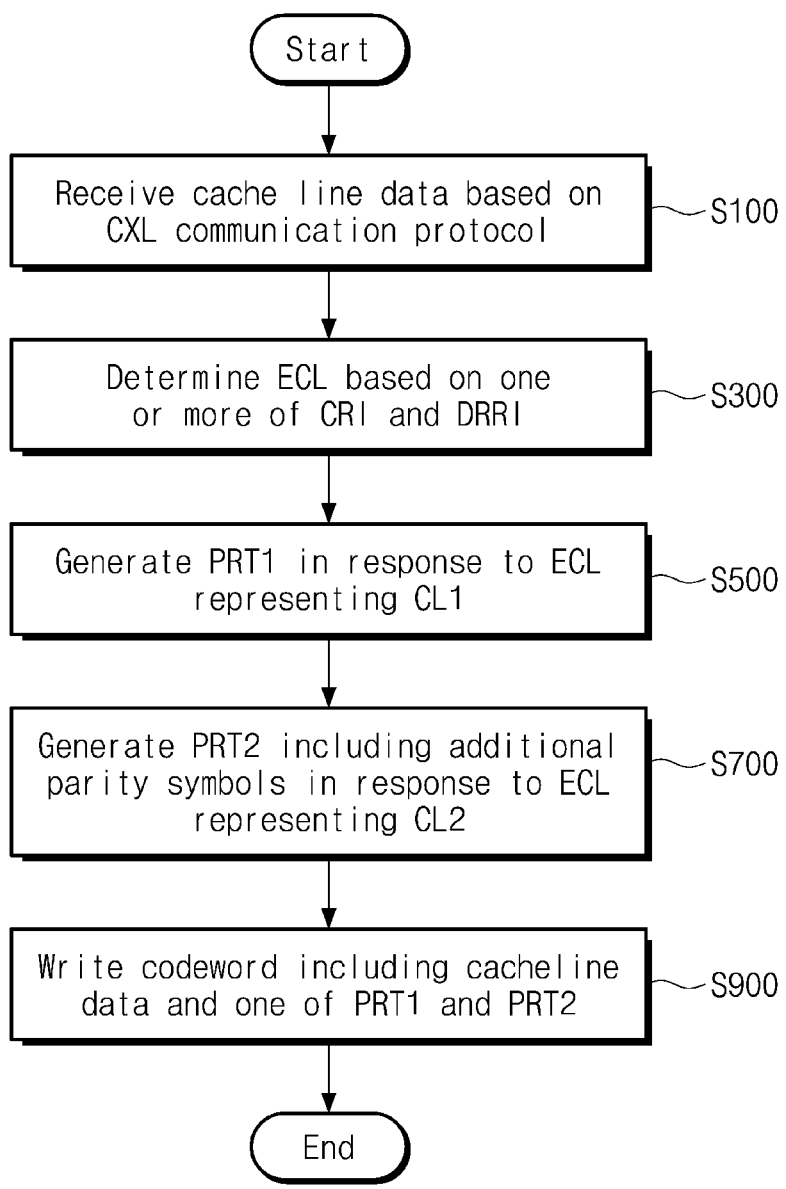
FIG. 2 is a flowchart illustrating an operating method of a memory system according to an embodiment of the present disclosure.

FIG. 2 is a flowchart illustrating an operating method of a memory system according to an embodiment of the present disclosure.

Referring to FIGS. 1 and 2, the memory system 200 (or the memory controller 210) may receive cache line data based on the CXL communication protocol (S100).

The memory system 200 (or the ECL manager 213) may determine an error correction level based on one or more of the cell reliability information CRI and the data reliability request information DRRI (S300).

When the error correction level indicates a first correction level, the memory system 200 (or the ECC engine 215) may generate the first parity symbols PRT1 associated with the cache line data (S500).

When the error correction level indicates a second correction level, the memory system 200 (or the ECC engine 215) may generate the second parity symbols PRT2 including the first parity symbols PRT1 and additional parity symbols (S700).

The memory system 200 (or the processor 211) may write the codeword CW, which includes the cache line data and either the first parity symbols PRT1 or the second parity symbols PRT2, in the plurality of volatile memory devices 250 (S900).

In an embodiment, the ECL manager 213 may generate the additional information ADTI, and the processor 211 may include the additional information ADTI in the codeword CW so as to be stored in the plurality of volatile memory devices 250. The additional information ADTI may include a cell error location that is capable of being used in the process of performing RS decoding on the codeword CW.

Figure 3:
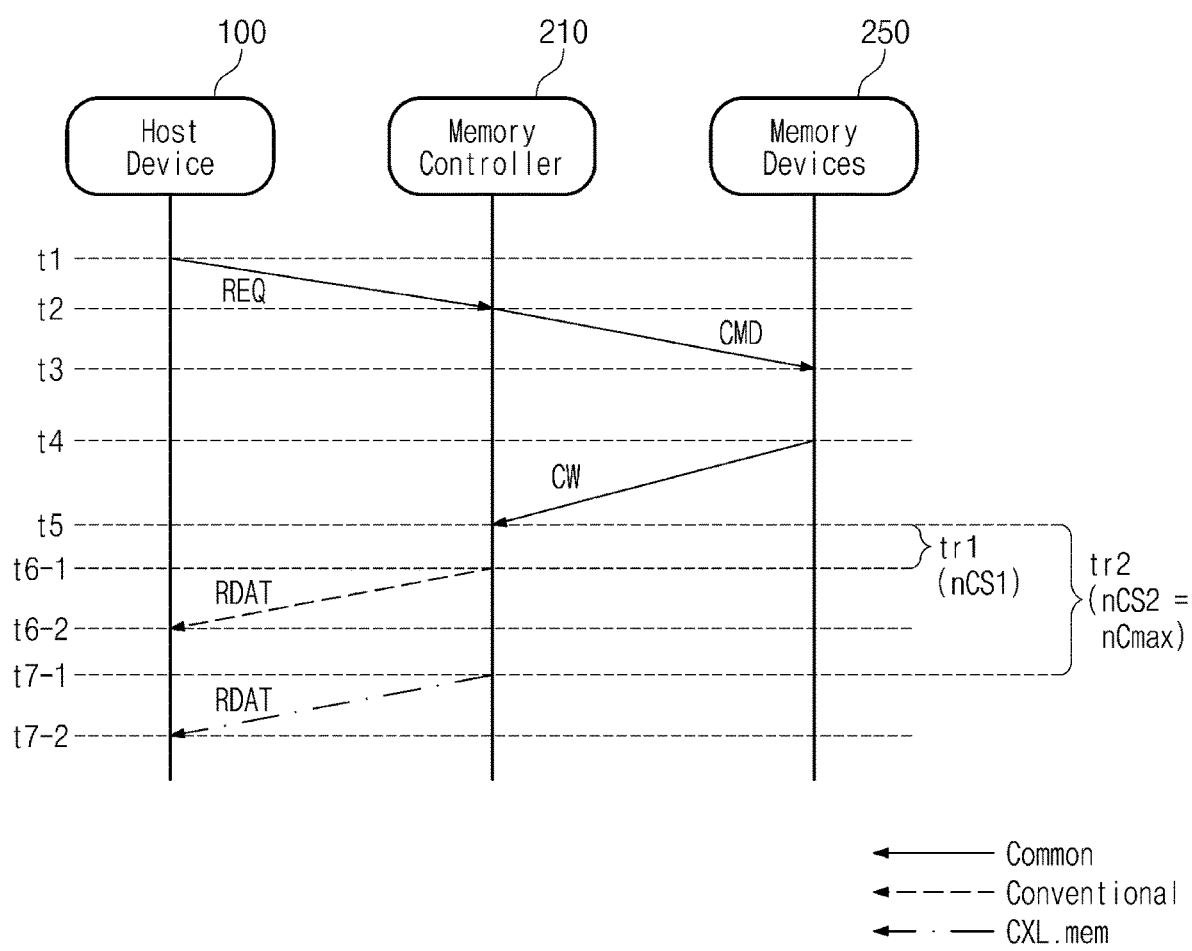
FIG. 3 is a diagram for describing an allowable decoding time range configurable depending on a CXL (Compute eXpress Link) communication protocol-based communication scheme between a host device and a memory system of FIG. 1.

FIG. 3 is a diagram for describing an allowable decoding time range configurable depending on a CXL communication protocol-based communication scheme between a host device and a memory system of FIG. 1.

Referring to FIGS. 1 and 3, in a time period from t1 to t2, the host device 100 may transmit the request REQ to the memory controller 210. In a time period from t2 to t3, the memory controller 210 may translate the request REQ into the command CMD and may transmit the command CMD to the plurality of volatile memory devices 250.

In a time period from t3 to t4, the plurality of volatile memory devices 250 may perform one or more operations corresponding to the command CMD under control of the memory controller 210. When the command CMD is a read command, in a time period from t4 to t5, the plurality of volatile memory devices 250 may transmit the codeword CW stored in target memory cells corresponding to the command CMD to the memory controller 210. In a time period from t5 to t6-1 or in a time period from t5 to t7-1, the memory controller 210 may decode the codeword CW to generate read data RDAT. In a time period from t6-1 to t6-2 or in a time period from t7-1 to t7-2, the memory controller 210 may transmit the read data RDAT to the host device 100.

In a conventional electronic system, an allowable decoding time range tr1 for the codeword CW may be from t5 to t6-1. In the electronic system 10 including a memory system according to an embodiment of the present disclosure, an allowable decoding time range tr2 may be from t5 to t7-1. The allowable decoding time range tr2 may be longer than the allowable decoding time range tr1, that is, a difference may exist between the allowable decoding time ranges tr1 and tr2. The reason is that when the host device 100 uses the plurality of volatile memory devices 250 as a main memory through the CXL communication protocol-based communication between the host device 100 and the memory system 200, a relatively longer allowable decoding time range is permitted for decoding depending on a condition defined by the CXL communication protocol.

In an embodiment, the correction of the given number of error symbols (e.g., nCS1) in the conventional electronic system is possible within the allowable decoding time range tr1, and the correction of error symbols, the number (e.g., nCS2) of which is more than in the conventional electronic system, is possible within the allowable decoding time range tr2. When the host device 100 and the memory system 200 communicate based on the CXL communication protocol, RS decoding may be performed within the allowable decoding time range tr2, which is secured based on the CXL communication protocol, by using either the first parity symbols PRT1 or the second parity symbols PRT2 described with reference to FIG. 1; with regard to the codeword CW, the memory system 200 may provide the error correction capability of "chipkill+multi-symbol" or more within the maximum number nCmax of correctable error symbols.

In an embodiment, the host device 100 may communicate with the memory system 200 by using one of various protocols complying with the CXL communication protocol. For example, by using "CXL.mem" of the CXL communication protocol, the host device 100 may transmit the request REQ or may receive the read data RDAT.

Figure 4:
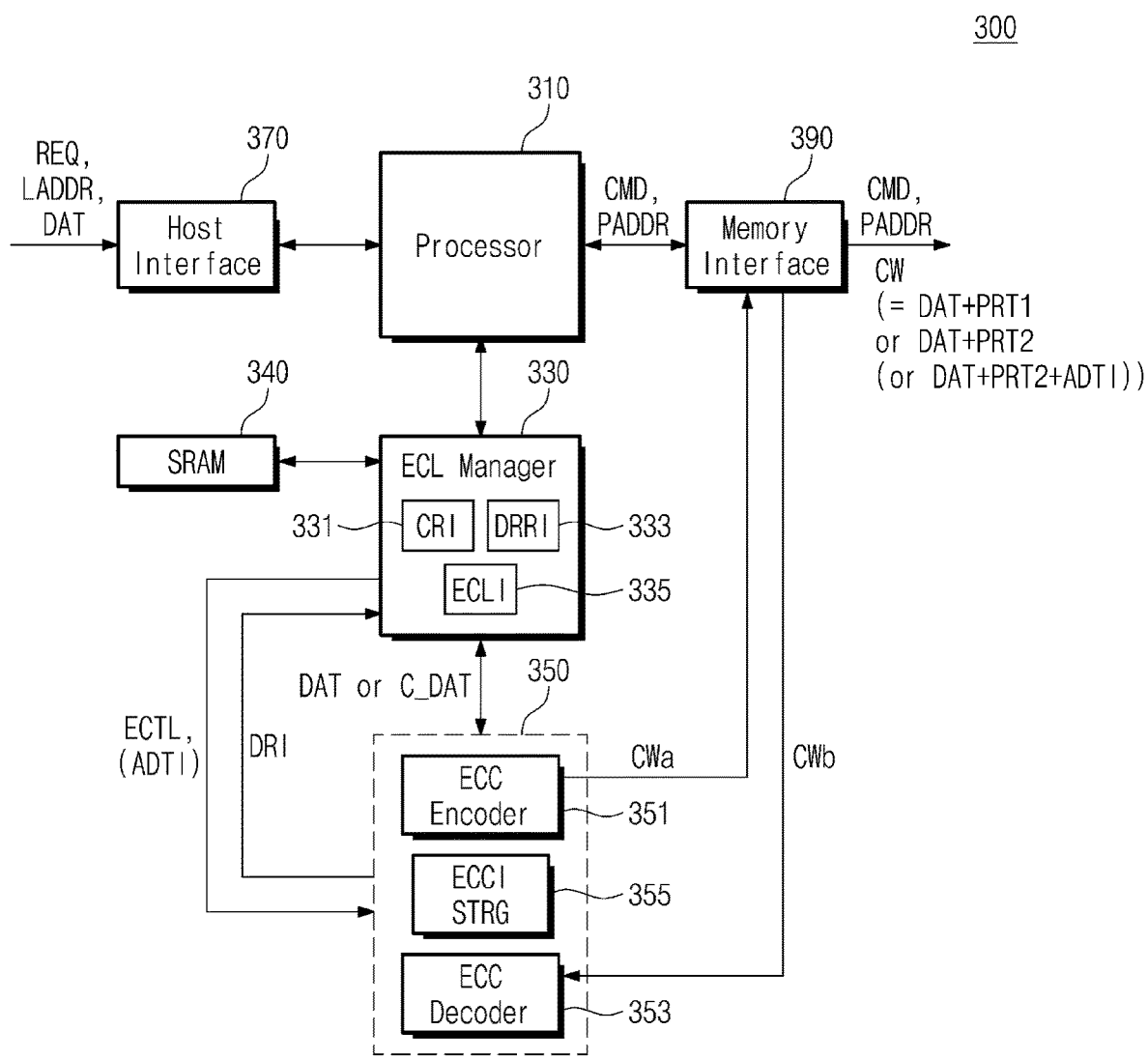
FIG. 4 is a block diagram illustrating an embodiment of a memory controller of FIG. 1.

FIG. 4 is a block diagram illustrating an embodiment of a memory controller of FIG. 1.

Referring to FIG. 4, a memory controller 300 may correspond to the memory controller 210 of FIG. 1. The memory controller 300 may include a processor 310, an ECL manager 330, an SRAM 340, an ECC engine 350, a host interface 370, and a memory interface 390. The components 310, 330, 350, 370, and 390 included in the memory controller 300 may respectively correspond to the components 211, 213, 215, 217, and 219 included in the memory controller 210.

The ECL manager 330 may manage cell reliability information (CRI) 331, data reliability request information (DRRI) 333, and error correction level information (ECLI) 335. The cell reliability information 331 may include the degree of cell reliability associated with cache line data and target memory cells, and the data reliability request information 333 may include the degree of data integrity associated with the cache line data and requested by a host device. The error correction level information 335 may indicate relationships between error correction levels and one or more of the cell reliability information 331 and the data reliability request information 333.

The ECL manager 330 may determine the degree of cell reliability of the target memory cells as one of a plurality of cell reliability levels, based on the number of fail cells included in the target memory cells and one or more threshold values.

The ECL manager 330 may determine the degree of data integrity as one of a plurality of data reliability request levels, based on an integrity value, which is indicated by an integrity indicator included in the request REQ received from the host device with regard to the cache line data, and one or more threshold values.

The ECL manager 330 may output the ECC control signal ECTL to the ECC engine 350 based on one or more of the degree of cell reliability and the degree of data integrity and the error correction level information 335, and may further output the additional information ADTI to the ECC engine 350.

The ECC engine 350 may include an ECC encoder 351, an ECC decoder 353, and an ECC information storage unit 355. The ECC encoder 351 may perform RS encoding on the cache line data based on the ECC control signal ECTL and may output a codeword CWa to a plurality of volatile memory devices. The ECC decoder 353 may perform RS decoding on a codeword CWb transmitted from the plurality of volatile memory devices and may output the decoded data. For the RS encoding and the RS decoding, the ECC information storage unit 355 may provide one or more generation matrices to the ECC encoder 351 or may provide one or more check matrices to the ECC decoder 353.

The host interface 370 may receive the request REQ and the logical address LADDR from the host device and may transmit or receive the data DAT corresponding to the request REQ to or from the host device. The memory interface 390 may transmit the command CMD and the physical address PADDR to the plurality of volatile memory devices and may transmit or receive the codeword CW corresponding to the command CMD to or from the plurality of volatile memory devices.

The codeword CW may include the codeword CWa and the codeword CWb and may further include the additional information ADTI. The data DAT may be cache line data, and the ECC encoder 351 may generate the parity symbols PRT1 and PRT2.

In an embodiment, the ECC engine 350 may transmit decoding result information DRI including one or more RS decoding results of the ECC decoder 353 to the ECL manager 330. The ECL manager 330 may determine a cell error location indicating a location of fail cells based on the decoding result information DRI and may apply the cell error location to one of the cell reliability information 331 and the data reliability request information 333.

Figure 5:
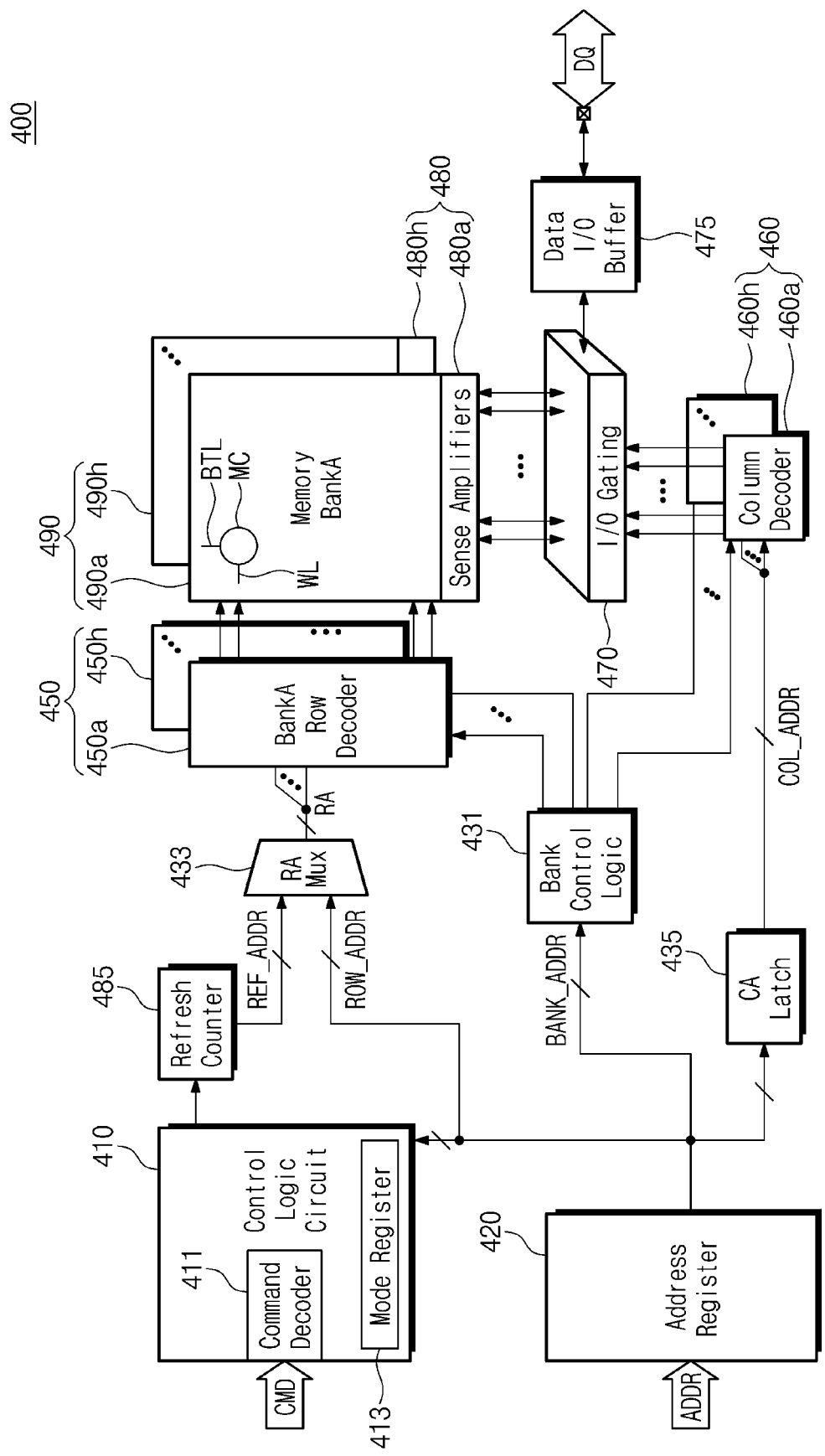
FIG. 5 is a block diagram illustrating an embodiment of a memory device of FIG. 1.

FIG. 5 is a block diagram illustrating an embodiment of a memory device of FIG. 1.

Referring to FIG. 5, a memory device 400 may include a control logic circuit 410, an address register 420, bank control logic 431, a row address multiplexer 433, a column address latch 435, a row decoder 450, a column decoder 460, a memory cell array 490, an input/output gating circuit 470, a sense amplifier unit 480, a data input/output buffer 475, and a refresh counter 485.

The memory cell array 490 may include first to eighth memory banks 490a to 490h. The row decoder 450 may include first to eighth bank row decoders 450a to 450h respectively connected to the first to eighth memory banks 490a to 490h, the column decoder 460 may include first to eighth bank column decoders 460a to 460h respectively connected to the first to eighth memory banks 490a to 490h, and the sense amplifier unit 480 may include first to eighth bank sense amplifiers 480a to 480h respectively connected to the first to eighth memory banks 490a to 490h.

The first to eighth memory banks 490a to 490h, the first to eighth bank sense amplifiers 480a to 480h, the first to eighth bank row decoders 450a to 450h, and the first to eighth bank column decoders 460a to 460h may constitute first to eighth banks. Each of the first to eighth memory banks 490a to 490h may include a plurality of word lines WLs, a plurality of bit lines BLs, and a plurality of memory cells MC formed at intersections of the word lines WLs and the bit lines BLs.

An example of the memory device 400 including 8 banks is illustrated in FIG. 5. However, in other embodiments, the memory device 400 may include banks, the number of which is 2 or more.

The address register 420 may receive an address ADDR including a bank address BANK_ADDR, a row address ROW_ADDR, and a column address COL_ADDR from a memory controller (e.g., 210 of FIG. 1). The address register 420 may provide the received bank address BANK_ADDR to the bank control logic 431, may provide the received row address ROW_ADDR to the row address multiplexer 433, and may provide the received column address COL_ADDR to the column address latch 435.

The bank control logic 431 may generate bank control signals in response to the bank address BANK_ADDR. A bank row decoder corresponding to the bank address BANK_ADDR from among the first to eighth bank row decoders 450a to 450h may be activated in response to the bank control signals, and a bank column decoder corresponding to the bank address BANK_ADDR from among the first to eighth bank column decoders 460a to 460h may be activated in response to the bank control signals.

The row address multiplexer 433 may receive the row address ROW_ADDR from the address register 420 and may receive a refresh row address REF_ADDR from the refresh counter 485. The row address multiplexer 433 may selectively output the row address ROW_ADDR or the refresh row address REF_ADDR as a row address RA. The row address RA output from the row address multiplexer 433 may be applied to each of the first to eighth bank row decoders 450a to 450h.

A bank row decoder activated by the bank control logic 431 from among the first to eighth bank row decoders 450a to 450h may decode the row address RA output from the row address multiplexer 433 and may activate a word line corresponding to the row address RA. For example, the activated bank row decoder may apply a word line driving voltage to the word line corresponding to the row address RA. The activated bank row decoder may generate the word line driving voltage by using a power supply voltage and may provide the word line driving voltage to the corresponding word line.

The column address latch 435 may receive the column address COL_ADDR from the address register 420 and may temporarily store the received column address COL_ADDR. Also, in a burst mode, the column address latch 435 may gradually (or sequentially) increase the received column address COL_ADDR. The column address latch 435 may apply the temporarily stored column address COL_ADDR or the gradually increased column address COL_ADDR to each of the first to eighth bank column decoders 460a to 460h.

A bank column decoder activated by the bank control logic 431 from among the first to eighth bank column decoders 460a to 460h may activate a sense amplifier corresponding to the bank address BANK_ADDR and the column address COL_ADDR through the input/output gating circuit 470.

The input/output gating circuit 470 may include the following together with circuits gating input/output data: input data mask logic, read data latches for storing data output from the first to eighth memory banks 490a to 490h, and write drivers for writing data in the first to eighth memory banks 490a to 490h.

Data read from one memory bank among the first to eighth memory banks 490a to 490h may be sensed by a sense amplifier corresponding to the one sense amplifier and may be latched by the read data latches. For example, the data read from the one memory bank may be the codeword CWb of FIG. 4.

The data stored in the read data latches may be provided to the memory controller through the data input/output buffer 475. Data DQ to be written in one memory bank among the first to eighth memory banks 490a to 490h may be provided to the data input/output buffer 475 from the memory controller. The data DQ provided to the data input/output buffer 475 may be provided to the input/output gating circuit 470. For example, the data to be written in the one memory bank may be the codeword CWa of FIG. 4.

The control logic circuit 410 may control the operation of the memory device 400. For example, the control logic circuit 410 may generate control signals such that the memory device 400 performs a write operation or a read operation. The control logic circuit 410 may include a command decoder 411 that decodes the command CMD received from the memory controller and a mode register 413 for setting an operation mode of the memory device 400.

FIGS. 6A, 6B, 6C, 6D, and 6E are diagrams for describing an embodiment of the process of determining an error correction level of FIGS. 1 and 2.

Figure 6A:
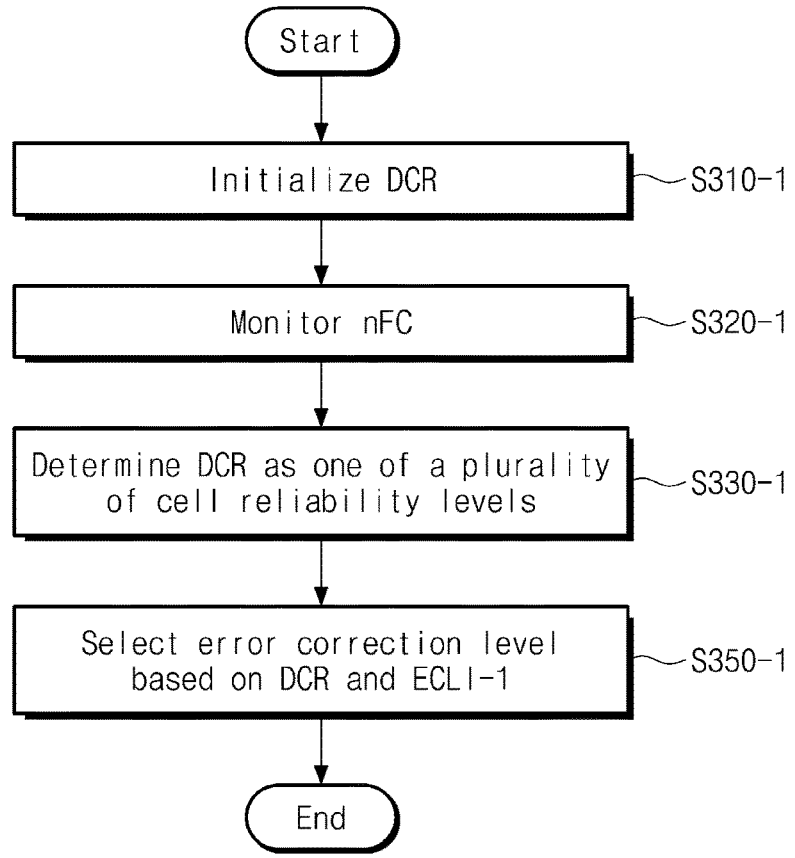
Figure 6B:
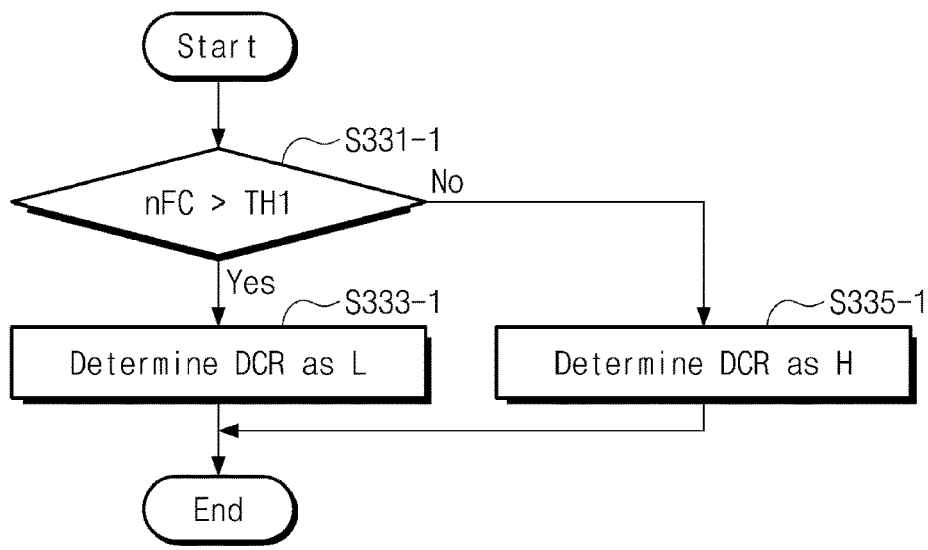

Referring to FIGS. 6A and 6B, an ECL manager (e.g., 213 of FIG. 1) may initialize a degree of cell reliability DCR (S310-1).

The ECL manager may determine the degree of cell reliability DCR of target memory cells as one of a plurality of cell reliability levels, based on the number of fail cells nFC and one or more threshold values (S330-1).

In an embodiment, the target memory cells may be included in a plurality of volatile memory devices (e.g., 250 of FIG. 1) and may indicate memory cells to be accessed with regard to the cache line data. The degree of cell reliability may indicate the target memory cell's capability to retain data while minimizing errors occurring in the stored data.

In an embodiment, the fail cells may be included in the plurality of volatile memory devices 250 and the target memory cells and may indicate arbitrary memory cells generating uncorrectable error symbols, and the number of fail cells nFC may be determined based on results of RS decoding operations performed on one or more previous codewords that were read previously (or in the past) from the plurality of volatile memory devices 250.

The ECL manager may select an error correction level based on the degree of cell reliability DCR of the target memory cells and error correction level information ECLI-1.

In an embodiment, the error correction level information ECLI-1 may indicate a relationship between the degree of cell reliability DCR and error correction levels.

In an embodiment, the ECL manager may monitor the number of fail cells nFC based on a result of decoding performed on a codeword associated with the cache line data (S320-1). As a result of the monitoring, the ECL manager may collect data for determining the degree of cell reliability of target memory cells associated with subsequent (or future) cache line data.

In operation S330-1 where the degree of cell reliability DCR of the target memory cells is determined as one of the plurality of cell reliability levels, the ECL manager may determine whether the number of fail cells nFC is greater than a first threshold value TH1 (S331-1).

When the number of fail cells nFC is greater than the first threshold value TH1 (Yes in operation S331-1), the ECL manager may determine the degree of cell reliability DCR of the target memory cells as a first cell reliability level (e.g., "L") among the plurality of cell reliability levels (S333-1).

When the number of fail cells nFC is smaller than or equal to the first threshold value TH1 (No in operation S331-1), the ECL manager may determine the degree of cell reliability DCR of the target memory cells as a second cell reliability level (e.g., "H") among the plurality of cell reliability levels (S335-1).

Figure 6C:
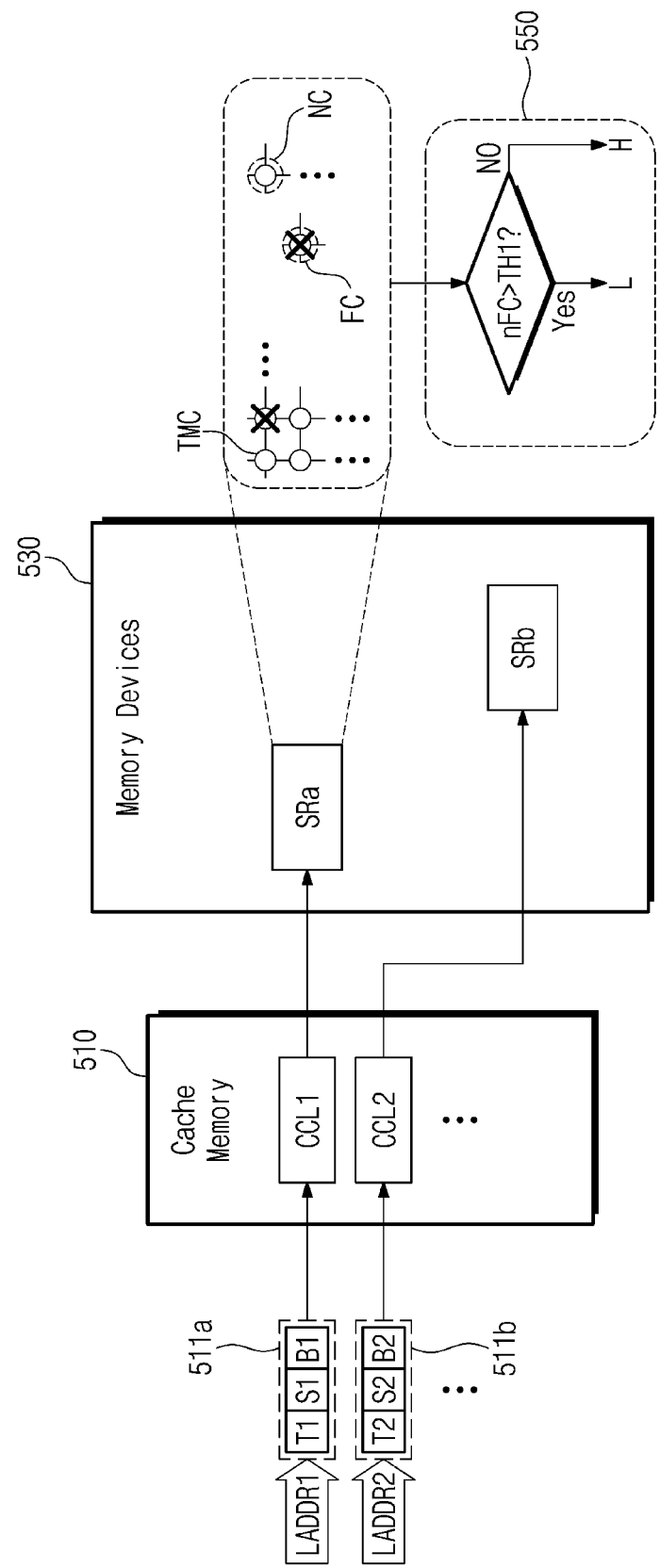

Referring to FIGS. 6A, 6B, and 6C, a cache memory 510 and a plurality of volatile memory devices 530 are illustrated. The cache memory 510 may correspond to the cache memory 110 of FIG. 1, and the plurality of volatile memory devices 530 may correspond to the plurality of volatile memory devices 250 of FIG. 1. A logical address LADDR1 generated by a host device may be converted into a cache line index 511a including a tag T1, a set index S1, and a block offset B1. The cache line index 511a may indicate an address of a region (e.g., CCL1) of the cache memory 510, which temporarily stores cache line data to be written in a storage region SRa of the plurality of volatile memory devices 530. The storage region SRa may include target memory cells TMCs, and the target memory cells TMCs may include one or more normal cells NCs and one or more fail cells FCs. In operation S330-1 of FIG. 6A and operation S331-1 of FIG. 6B, the ECL manager may determine whether the number of fail cells nFC of the target memory cells TMCs included in the storage region SRa where the cache line data are to be written is greater than the first threshold value TH1 (550).

A logical address LADDR2 generated by the host device may be converted into a cache line index 511b including a tag T2, a set index S2, and a block offset B2, and the cache line index 511b may indicate an address of a region (e.g., CCL2) of the cache memory 510, which temporarily stores cache line data to be written in a storage region SRb of the plurality of volatile memory devices 530. Through the same process as the storage region SRa, the ECL manager may determine whether the number of fail cells nFC of the target memory cells TMCs included in the storage region SRb is greater than the first threshold value TH1.

Referring to FIGS. 6A, 6B, 6C, and 6D, the cell reliability information CRI may include a cache line index and the degree of cell reliability DCR.

In operation S330-1 of FIG. 6A and operation S331-1 of FIG. 6B, the ECL manager may determine the degree of cell reliability DCR of the target memory cells as one of the first cell reliability level and the second cell reliability level, and the degree of cell reliability DCR may be identified by the cache line index.

For example, the ECL manager may initialize the degree of cell reliability associated with each of one or more cache line indexes (e.g., CCL1, CCL2, CCL3, etc.) to the second cell reliability level. By performing operation S330-1 of FIG. 6A and operation S331-1 of FIG. 6B associated with arbitrary cache line data plural times, the ECL manager may change the degree of cell reliability associated with a cache line index (e.g., CCL1) to the first cell reliability level from the second cell reliability level or may maintain the degree of cell reliability associated with each of cache line indexes (e.g., CCL2 and CCL3) at the second cell reliability level.

Referring to FIGS. 6A, 6B, 6C, 6D, and 6E, the error correction level information ECLI-1 may include the degree of cell reliability DCR and the ECC control signal ECTL and may further include the number of parity symbols and the number of correctable error symbols.

In an embodiment, when the degree of cell reliability DCR has the first cell reliability level, the error correction level information ECLI-1 may be set such that the ECC control signal ECTL indicates a second correction level CL2; when the degree of cell reliability DCR has the second cell reliability level, the error correction level information ECLI-1 may be set such that the ECC control signal ECTL indicates a first correction level CL1. In this case, the error correction capability that the second correction level CL2 provides may be higher than the error correction capability that the first correction level CL1 provides.

For example, when the ECC control signal ECTL indicates the first correction level CL1, the ECL manager may allow an ECC engine to generate parity symbols, the first number of which corresponds to a first value "p" (p being an integer greater than "0"); when the ECC control signal ECTL indicates the second correction level CL2, the ECL manager may allow the ECC engine to generate parity symbols, the second number of which corresponds to a second value "q" (q being an integer greater than p) greater than the first value "p".

For example, when the ECL manager determines the degree of cell reliability DCR of the target memory cells as the second cell reliability level, the ECL manager may allow the ECC engine to generate the first number of parity symbols "p"; when the ECL manager determines the degree of cell reliability DCR of the target memory cells as the first cell reliability level, the ECL manager may allow the ECC engine to generate the second number of parity symbols "q". As described above, the second number of parity symbols "q" may be more than the first number of parity symbols "p".

For example, in the process of performing RS decoding, "p" parity symbols may be for correcting "L" error symbols (L being an integer greater than "0"), and "q" parity symbols may be for correcting "M" error symbols (M being an integer greater than L).

FIGS. 7A, 7B, 7C, 7D, and 7E are diagrams for describing an embodiment of the process of determining an error correction level of FIGS. 1 and 2.

Figure 7A:
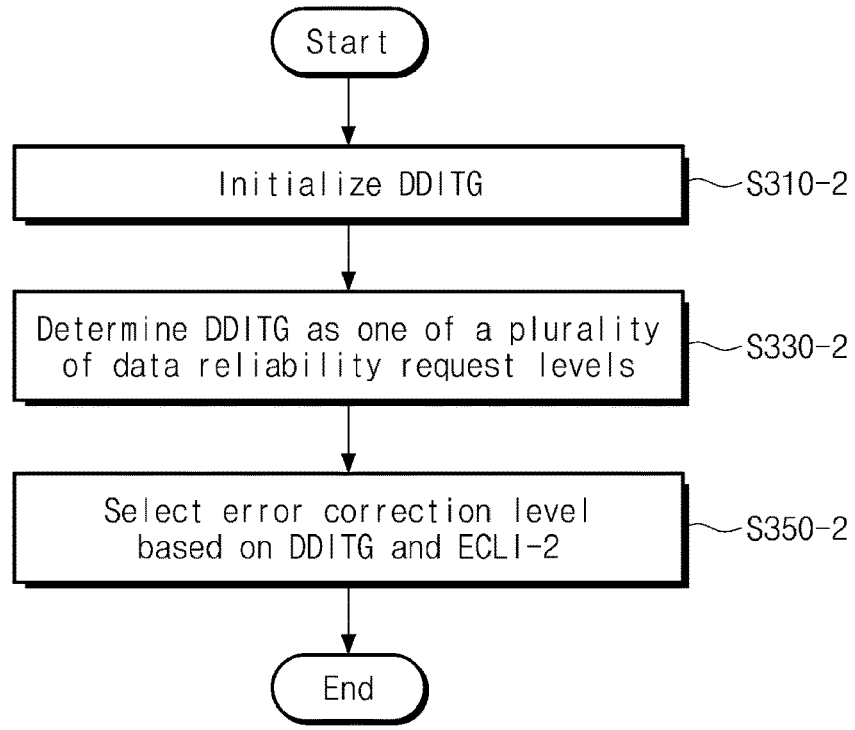
Figure 7B:
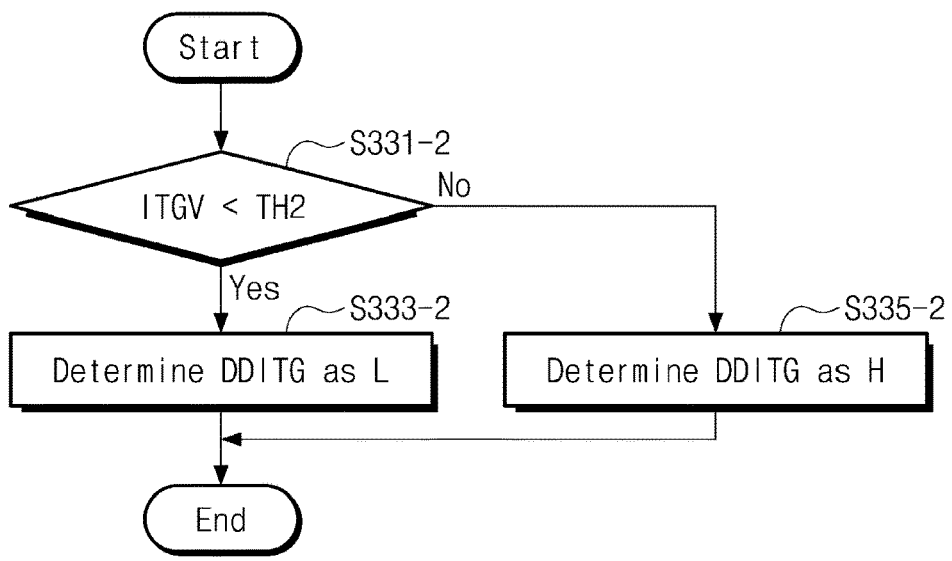

Referring to FIGS. 7A and 7B, an ECL manager (e.g., 213 of FIG. 1) may initialize the degree of data integrity DDITG (S310-2).

The ECL manager may determine the degree of data integrity DDITG as one of a plurality of data reliability request levels based on an integrity value indicated by an integrity indicator and one or more threshold values (S330-2).

In an embodiment, the degree of data integrity DDITG may indicate the correctness and consistency of data requested by a host device.

The ECL manager may select an error correction level based on the degree of data integrity DDITG and error correction level information ECLI-2 (S350-2).

In an embodiment, the error correction level information ECLI-2 may indicate a relationship between the data reliability request information DRRI including the degree of data integrity DDITG and error correction levels.

In operation S330-2 where the degree of data integrity DDITG is determined as one of the plurality of data reliability request levels, the ECL manager may determine whether an integrity value ITGV is smaller than a second threshold value TH2 (S331-2).

When the integrity value ITGV is smaller than the second threshold value TH2 (Yes in operation S331-2), the ECL manager may determine the degree of data integrity DDITG as a first data reliability request level (e.g., "L") among the plurality of data reliability request levels (S333-2).

When the integrity value ITGV is greater than or equal to the second threshold value TH2 (No in operation S331-2), the ECL manager may determine the degree of data integrity DDITG as a second data reliability request level (e.g., "H") among the plurality of data reliability request levels (S335-2).

Figure 7C:
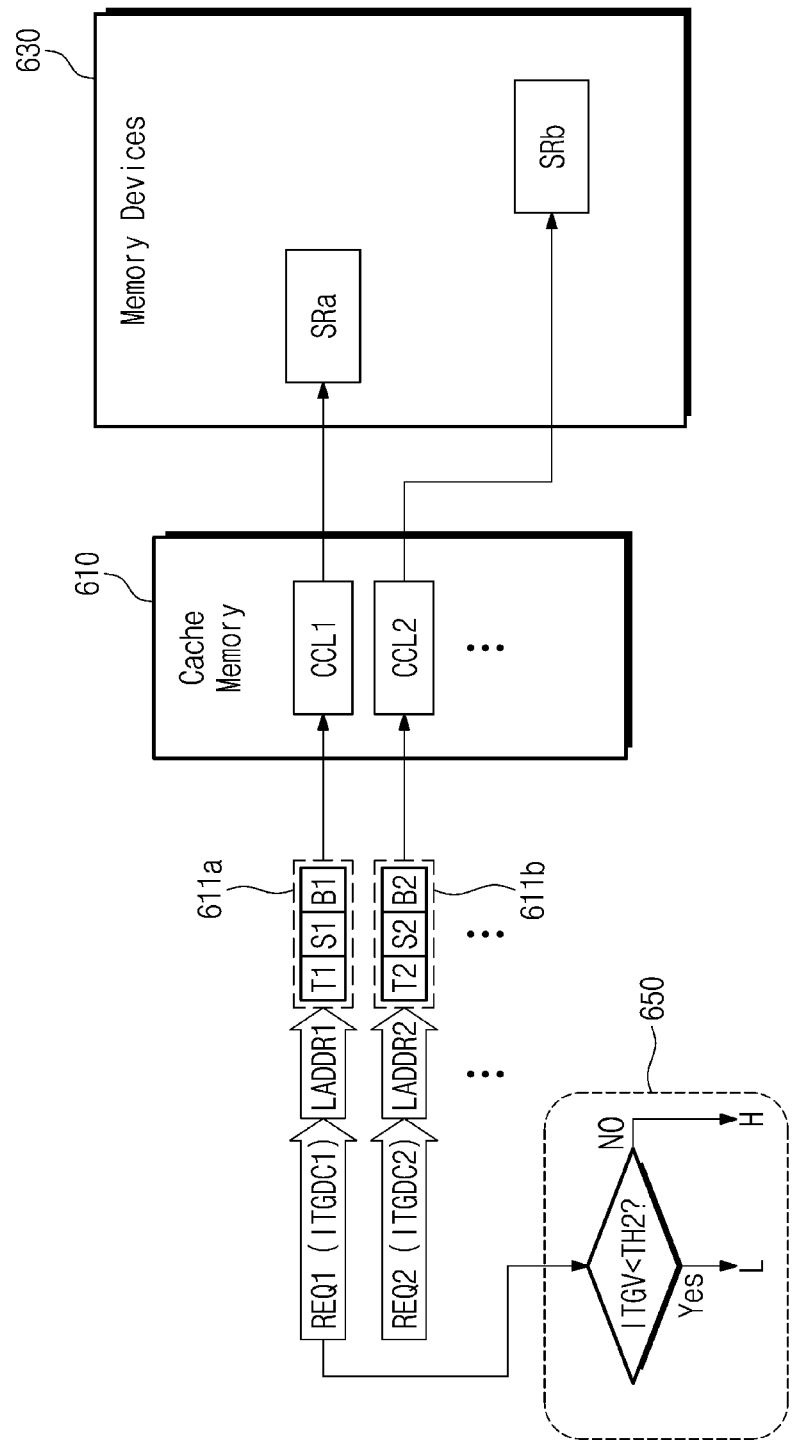

Referring to FIGS. 7A, 7B, and 7C, a cache memory 610 and a plurality of volatile memory devices 630 are illustrated. The cache memory 610 may correspond to the cache memory 110 of FIG. 1, and the plurality of volatile memory devices 630 may correspond to the plurality of volatile memory devices 250 of FIG. 1. A logical address LADDR1 generated by a host device may be converted into a cache line index 611a including a tag T1, a set index S1, and a block offset B1. The cache line index 611a may indicate an address of a region (e.g., CCL1) of the cache memory 610, which temporarily stores cache line data to be written in a storage region SRa of the plurality of volatile memory devices 630. An integrity indicator ITGDC1 that is included in a request of a host device corresponding to cache line data to be temporarily stored in the region CCL1 may indicate the integrity value ITGV. In operation S330-2 of FIG. 7A and operation S331-2 of FIG. 7B, the ECL manager may determine whether the integrity value ITGV is greater than the second threshold value TH2 (S650).

A logical address LADDR2 generated by the host device may be converted into a cache line index 611b including a tag T2, a set index S2, and a block offset B2, and the cache line index 611b may indicate an address of a region (e.g., CCL2) of the cache memory 610, which temporarily stores cache line data to be written in a storage region SRb of the plurality of volatile memory devices 630. Through the same process as the integrity indicator ITGDC1, the ECL manager may determine whether the integrity value ITGV indicated by an integrity indicator ITGDC2 included in a request (e.g., REQ2) of the host device is smaller than the second threshold value TH2.

Referring to FIGS. 7A, 7B, 7C, and 7D, the data reliability request information DRRI may include a cache line index and the degree of data integrity DDITG.

In operation S330-2 of FIG. 7A and operation S331-1 of FIG. 7B, the ECL manager may determine the degree of data integrity DDITG as one of the first data reliability request level and the second data reliability request level, and the degree of data integrity DDITG may be identified by the cache line index.

For example, the ECL manager may initialize the degree of data integrity associated with each of one or more cache line indexes (e.g., CCL1, CCL2, CCL3, etc.) to the first data reliability request level. In operation S330-2 of FIG. 7A and operation S331-2 of FIG. 7B associated with arbitrary cache line data, the ECL manager may maintain the degree of data integrity associated with a cache line index (e.g., CCL1) at the first data reliability request level, may change the degree of data integrity associated with a cache line index (e.g., CCL2) from the first data reliability request level to the second data reliability request level, or may again change the degree of data integrity to the first data reliability request level after changing the degree of data integrity associated with a cache line index (e.g., CCL3) from the first data reliability request level to the second data reliability request level.

Referring to FIGS. 7A, 7B, 7C, 7D, and 7E, the error correction level information ECLI-2 may include the degree of data integrity DDITG and the ECC control signal ECTL and may further include the number of parity symbols and the number of correctable error symbols.

In an embodiment, when the degree of data integrity DDITG has the second data reliability request level, the error correction level information ECLI-2 may be set such that the ECC control signal ECTL indicates the second correction level CL2; when the degree of data integrity DDITG has the first data reliability request level, the error correction level information ECLI-2 may be set such that the ECC control signal ECTL indicates the first correction level CL1. In this case, the error correction capability that the second correction level CL2 provides may be higher than the error correction capability that the first correction level CL1 provides.

For example, when the ECC control signal ECTL indicates the first correction level CL1, the ECL manager may allow an ECC engine to generate parity symbols, the first number of which corresponds to the first value "p"; when the ECC control signal ECTL indicates the second correction level CL2, the ECL manager may allow the ECC engine to generate parity symbols, the second number of which corresponds to the second value "q" greater than the first value "p".

For example, when the ECL manager determines the degree of data integrity DDITG as the first data reliability request level, the ECL manager may allow the ECC engine to generate the first number of parity symbols "p"; when the ECL manager determines the degree of data integrity DDITG as the second data reliability request level, the ECL manager may allow the ECC engine to generate the second number of parity symbols "q". As described above, the second number of parity symbols "q" may be more than the first number of parity symbols "p".

For example, in the process of performing RS decoding, "p" parity symbols may be for correcting "L" error symbols, and "q" parity symbols may be for correcting "M" error symbols.

Figure 8:
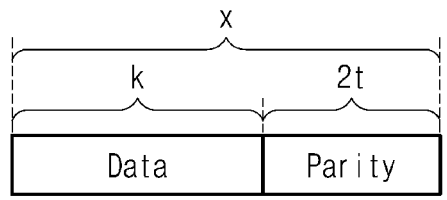
FIGS. 8 and 9 are diagrams for describing error correction capability of a memory system according to an embodiment of the present disclosure.
Figure 9:
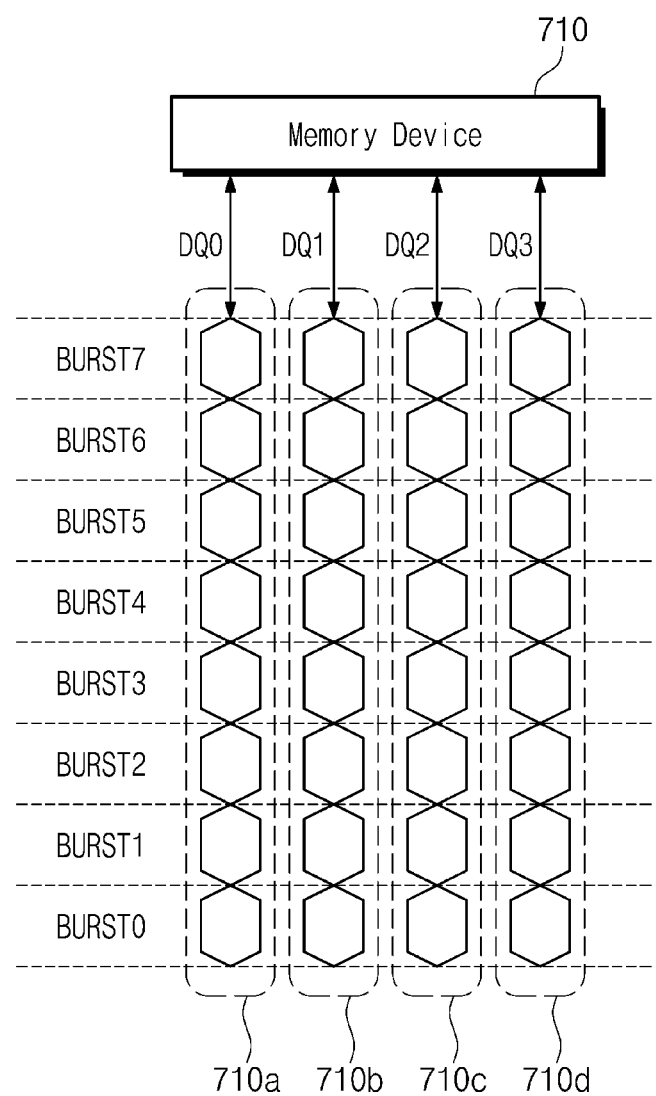

FIGS. 8 and 9 are diagrams for describing error correction capability of a memory system according to an embodiment of the present disclosure.

As described with reference to FIG. 1, in the memory system according to an embodiment of the present disclosure, an ECC engine (e.g., 215 of FIG. 1) may adopt the RS code theory capable of correcting multi-error bits by a symbol unit.

Referring to FIG. 8, a main parameter of the RS code may be expressed by RS (x, k). Herein, "k" may represent the number of symbols included in cache line data targeted for RS encoding, "x" may represent a value obtained by adding "k" and "2t", "2t" may represent the number of parity symbols generated (or added) by RS encoding, and "t" may represent the error correction capability of the given RS code capable of correcting error symbols.

Referring to FIG. 9, a memory device 710 may correspond to one (e.g., 400 of FIG. 5) of a plurality of volatile memory devices (e.g., 250 of FIG. 1).

In an embodiment, the memory device 710 may have a data width of "x4" and may simultaneously receive/transmit plural 4-bit data as DQ0, DQ1, DQ2, and DQ3. When the memory device 710 supports the burst mode, as illustrated in FIG. 9, through one access of a host device, data may be received/transmitted as 8 bursts BURST0, BURST1, BURST2, BURST3, BURST4, BURST5, BURST6, BURST7, and BURST8; in this case, each of data 710a received/transmitted as DQ0, data 710b received/transmitted as DQ1, data 710c received/transmitted as DQ2, and data 710d received/transmitted as DQ3 may correspond to one symbol of the RS code. However, the present disclosure is not limited thereto. In another embodiment, the data width of the memory device 710 and the number of bursts corresponding to one access of the host device may be variously changed or modified.

Figure 10:
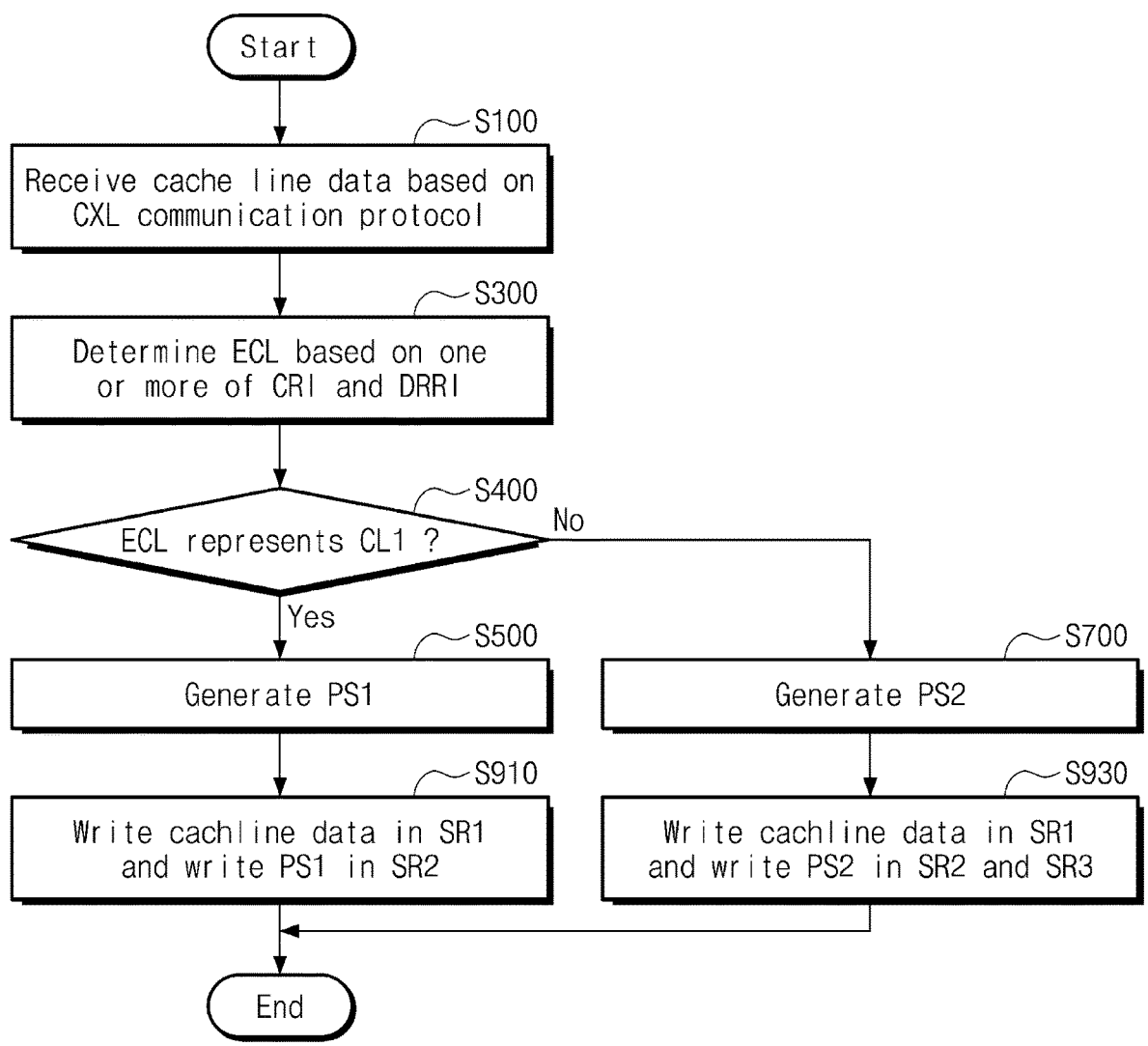
FIG. 10 is a flowchart illustrating an operating method of a memory system according to an embodiment of the present disclosure.

FIG. 10 is a flowchart illustrating an operating method of a memory system according to an embodiment of the present disclosure.

Referring to FIGS. 1, 2, and 10, in the operating method of the memory system 200, the memory system 200 (or the memory controller 210) may receive cache line data from a host device based on the CXL communication protocol (S100).

The memory system 200 (or the ECL manager 213) may determine an error correction level ECL based on one or more of the cell reliability information CRI and the data reliability request information DRRI (S300).

The memory system 200 (or the ECL manager 213) may determine whether the error correction level ECL indicates the first correction level CL1 (S400).

When the error correction level ECL indicates the first correction level CL1 (Yes in operation S400), the memory system 200 (or the ECL manager 213) may generate the first parity symbols PRT1 associated with the cache line data (S500), may write the cache line data in the first storage region (SR1) 251 included in the plurality of volatile memory devices 250, and may write the first parity symbols PRT1 in the second storage region (SR2) 253 included in the plurality of volatile memory devices 250 (S910).

When the error correction level ECL does not indicate the first correction level CL1 (No in operation S400), the memory system 200 (or the ECL manager 213) may generate the second parity symbols PRT2 associated with the cache line data (S700), may write the cache line data in the first storage region (SR1) 251, and may write the second parity symbols PRT2 in the second storage region (SR2) 253 and the third storage region (SR3) 255 included in the plurality of volatile memory devices 250 (S930).

In an embodiment, the ECL manager 213 may generate additional information (e.g., ADTI of FIG. 1), and the processor 211 may include the additional information in the codeword CW so as to be stored in the plurality of volatile memory devices 250. The additional information may include a cell error location that is capable of being used in the process of performing RS decoding on the codeword CW. The additional information may be stored in a plurality of volatile memory devices like cache line data and any other parity symbols, and the plurality of volatile memory devices may include a DRAM and an SRAM.

Figures 11A, 11B:
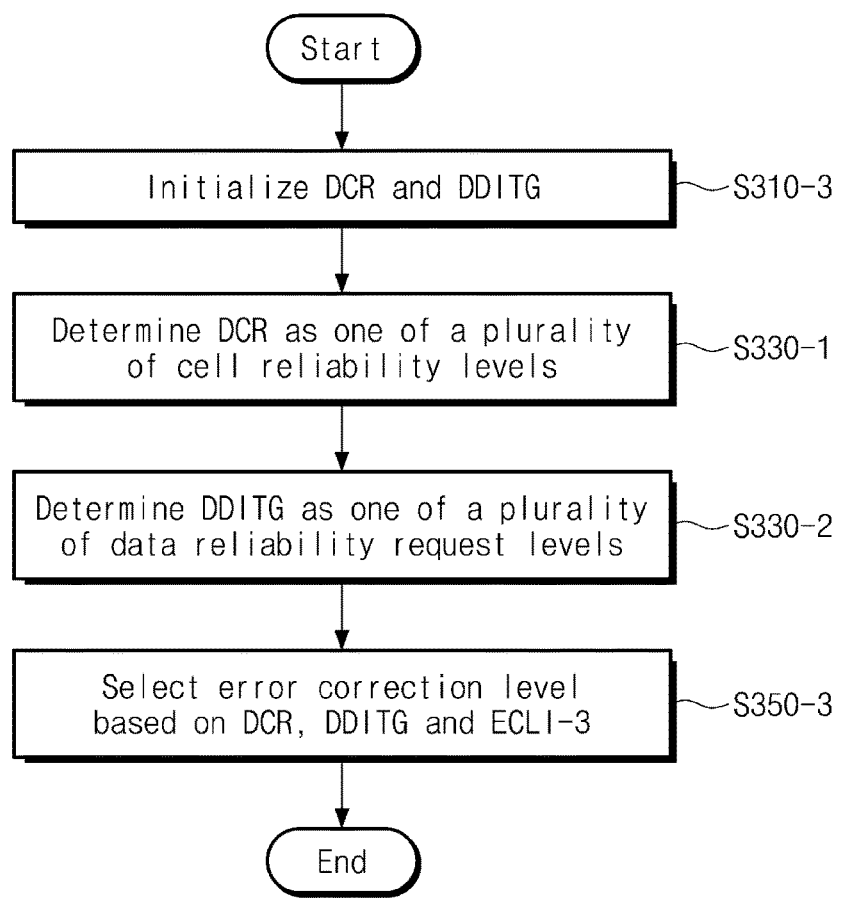
FIGS. 11A and 11B are diagrams for describing an embodiment of the process of determining an error correction level, which is described with reference to FIG. 10.

FIGS. 11A and 11B are diagrams for describing an embodiment of the process of determining an error correction level, which is described with reference to FIG. 10.

Referring to FIG. 11A, an ECL manager (e.g., 213 of FIG. 1) may initialize the degree of cell reliability DCR and the degree of data integrity DDITG (S310-3).

The ECL manager may determine the degree of cell reliability DCR of target memory cells as one of a plurality of cell reliability levels, based on the number of fail cells and one or more threshold values (S330-1).

In an embodiment, operation S330-1 of FIG. 11A may be substantially identical to operation S330-1 described with reference to FIGS. 6A and 6B.

The ECL manager may determine the degree of data integrity DDITG as one of a plurality of data reliability request levels based on an integrity value indicated by an integrity indicator and one or more threshold values (S330-2).

In an embodiment, operation S330-2 of FIG. 11A may be substantially identical to operation S330-2 described with reference to FIGS. 7A and 7B.

The ECL manager may select an error correction level based on the degree of cell reliability DCR of the target memory cells, the degree of data integrity DDITG, and error correction level information ECLI-3 (S350-3).

In an embodiment, the error correction level information ECLI-3 may indicate a relationship between the degree of cell reliability DCR, the degree of data integrity DDITG, and the error correction levels.

Referring to FIGS. 11A and 11B, the error correction level information ECLI-3 may include the degree of cell reliability DCR, the degree of data integrity DDITG, and the ECC control signal ECTL and may further include the number of parity symbols and the number of correctable error symbols.

In an embodiment, when the degree of cell reliability DCR has a first cell reliability level (e.g., "L") and the degree of data integrity DDITG has a second data reliability request level (e.g., "H"), when the degree of cell reliability DCR has a second cell reliability level (e.g., "H") and the degree of data integrity DDITG has the second data reliability request level, and when the degree of cell reliability DCR has the first cell reliability level and the degree of data integrity DDITG has a first data reliability request level (e.g., "L"), the error correction level information ECLI-3 may be set such that the ECC control signal ECTL indicates the second correction level CL2.

In an embodiment, when the degree of cell reliability DCR has the second cell reliability level and the degree of data integrity DDITG has the first data reliability request level, the error correction level information ECLI-3 may be set such that the ECC control signal ECTL indicates the first correction level CL1.

For example, when the ECC control signal ECTL indicates the first correction level CL1, the ECL manager may allow an ECC engine to generate parity symbols, the first number of which corresponds to the first value "p"; when the ECC control signal ECTL indicates the second correction level CL2, the ECL manager may allow the ECC engine to generate parity symbols, the second number of which corresponds to the second value "q" greater than the first value "p".

For example, in the process of performing RS decoding, "p" parity symbols may be for correcting "L" error symbols, and "q" parity symbols may be for correcting "M" error symbols.

Figure 12:
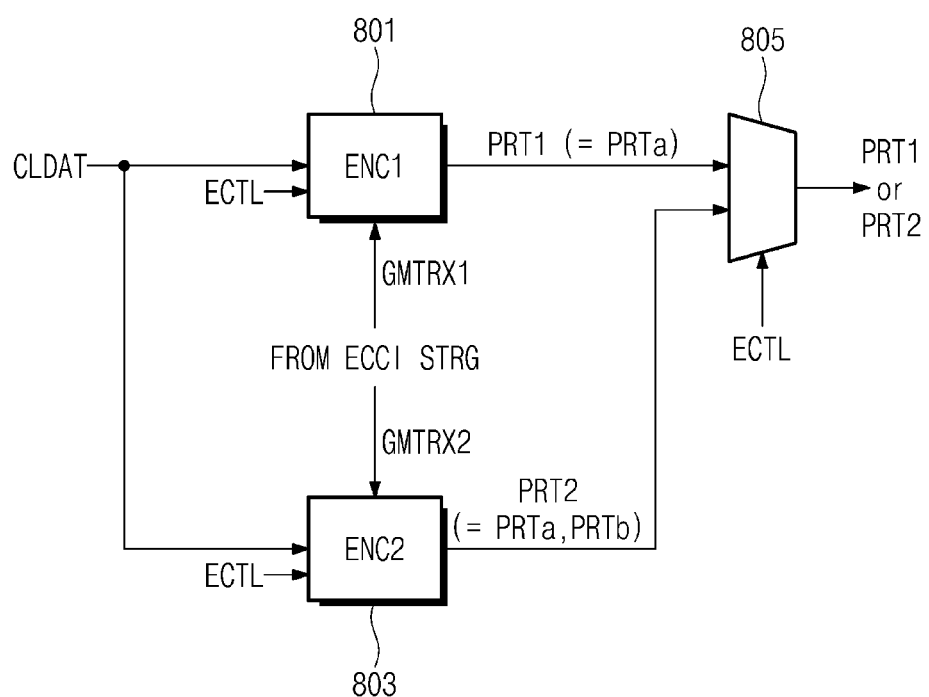
FIG. 12 is a block diagram illustrating an embodiment of an error correction code (ECC) encoder of FIG. 4.

FIG. 12 is a block diagram illustrating an embodiment of an ECC encoder of FIG. 4.

Referring to FIG. 12, an ECC encoder 800 may correspond to the ECC encoder 351 of FIG. 4. The ECC encoder 800 may include a first encoder 801, a second encoder 803, and a multiplexer 805.

The first encoder 801 and the second encoder 803 may receive cache line data CLDAT from a processor (e.g., 310 of FIG. 1) or an ECL manager (e.g., 330 of FIG. 1) and may receive the ECC control signal ECTL from the ECL manager.

The first encoder 801 may further receive a first generation matrix GMTRX1 from an ECC information storage unit (e.g., 355 of FIG. 1), and the second encoder 803 may further include a second generation matrix GMTRX2 from the ECC information storage unit.

The first encoder 801 may generate the first parity symbols PRT1 described with reference to FIGS. 1 and 2 by encoding the cache line data CLDAT based on the cache line data CLDAT and the first generation matrix GMTRX1.

The second encoder 803 may generate the second parity symbols PRT2 described with reference to FIGS. 1 and 2 by encoding the cache line data CLDAT based on the cache line data CLDAT and the second generation matrix GMTRX2.

In an embodiment, the second parity symbols PRT2 may include the first parity symbols PRT1 and additional parity symbols. For example, when the first parity symbols PRT1 include "PRTa", the second parity symbols PRT2 may include "PRTa" and "PRTb"; in this case, "PRTb" may be the additional parity symbols described with reference to FIGS. 1 and 2.

The multiplexer 805 may receive the first parity symbols PRT1 from the first encoder 801 and may receive the second parity symbols PRT2 from the second encoder 803. The multiplexer 805 may select either the first parity symbols PRT1 or the second parity symbols PRT2 based on the ECC control signal ECTL. For example, when the ECC control signal ECTL indicates a first correction level, the multiplexer 805 may select the first parity symbols PRT1; when the ECC control signal ECTL indicates a second correction level, the multiplexer 805 may select the second parity symbols PRT2. However, the present disclosure is not limited thereto. In another embodiment, only one of the first encoder 801 and the second encoder 803 may be enabled based on the ECC control signal ECTL. For example, when the ECC control signal ECTL indicates the first correction level, only the first encoder 801 may be enabled; when the ECC control signal ECTL indicates the second correction level, only the second encoder 803 may be enabled.

Figure 13:
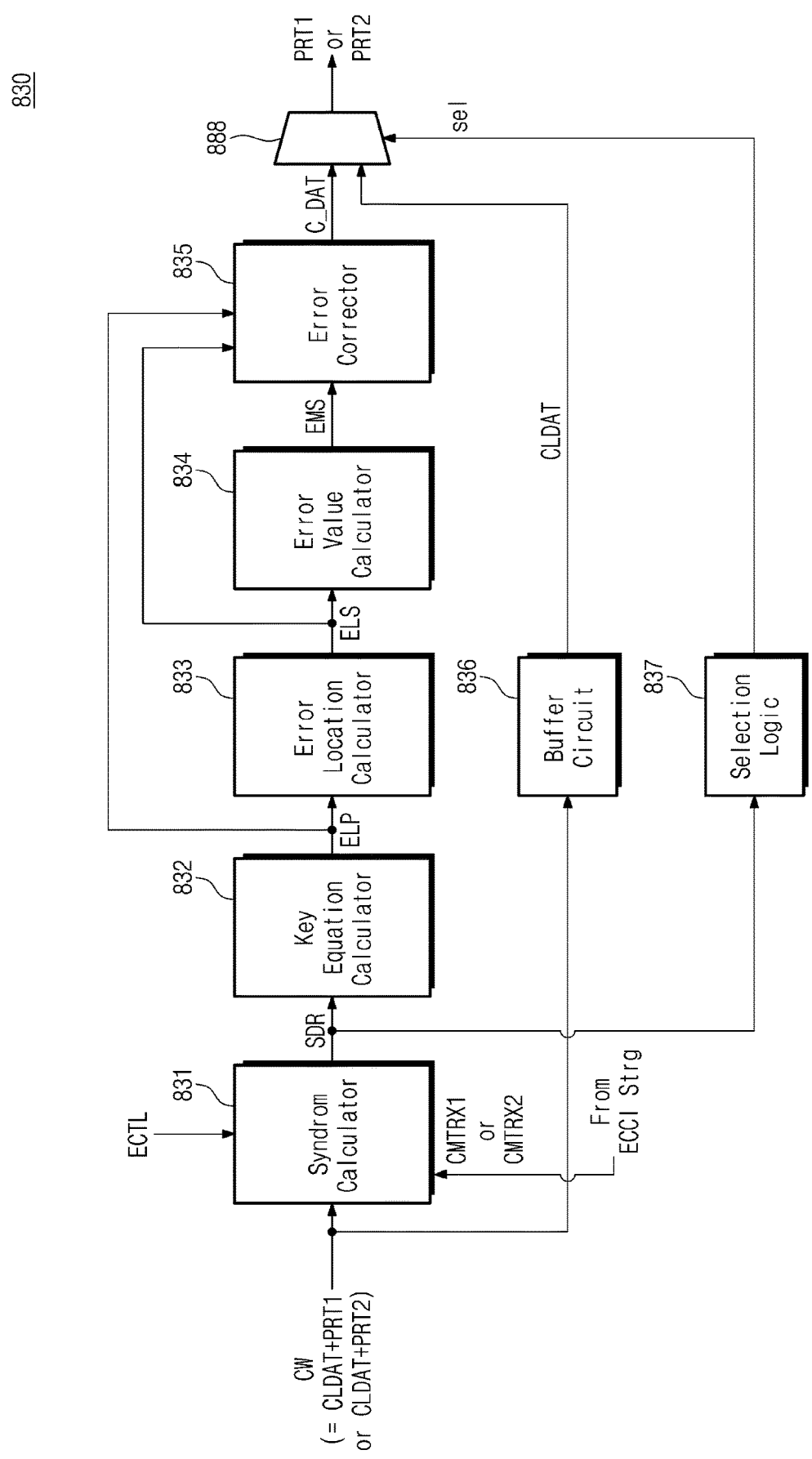
FIG. 13 is a block diagram illustrating an embodiment of an ECC decoder of FIG. 4.

FIG. 13 is a block diagram illustrating an embodiment of an ECC decoder of FIG. 4.

Referring to FIG. 13, an ECC decoder 830 may correspond to the ECC decoder 353 of FIG. 4. The ECC decoder 830 may include a syndrome calculator 831, a key equation calculator 832, an error location calculator 833, an error value calculator 834, an error corrector 835, a buffer circuit 836, selection logic 837, and a multiplexer 888.

The syndrome calculator 831 may receive the codeword CW, which includes the cache line data CLDAT and the first parity symbols PRT1 or includes the cache line data CLDAT and the second parity symbols PRT2, from a plurality of volatile memory devices (e.g., 250 of FIG. 1). The syndrome calculator 831 may receive a first check matrix CMTRX1 or a second check matrix CMTRX2 from an ECC information storage unit (e.g., 355 of FIG. 1) and may receive the ECC control signal ECTL from an ECL manager (e.g., 330 of FIG. 1).

The syndrome calculator 831 may select one of the first check matrix CMTRX1 and the second check matrix CMTRX2 based on the ECC control signal ECTL and may generate a syndrome SDR based on the cache line data CLDAT and the selected check matrix. For example, when the ECC control signal ECTL indicates a first correction level, the syndrome calculator 831 may select the first check matrix CMTRX1; when the ECC control signal ECTL indicates a second correction level, the syndrome calculator 831 may select the second check matrix CMTRX2.

The key equation calculator 832 may receive the syndrome SDR from the syndrome calculator 831, may generate an error location polynomial ELP based on the syndrome SDR, and may provide the error location polynomial ELP to the error location calculator 833 and the error corrector 835.

The error location calculator 833 may calculate error symbol locations ELS based on the error location polynomial ELP and may inform the error value calculator 834 and the error corrector 835 about the error symbol locations ELS.

The error value calculator 834 may calculate error sizes EMS based on the error symbol locations ELS and may inform the error corrector 835 about the error sizes EMS.

The error corrector 835 may generate corrected data C_DAT by correcting error symbols present in the cache line data CLDAT based on the error location polynomial ELP, the error symbol locations ELS, and the error sizes EMS and may output the corrected data C_DAT to the multiplexer 888.

The buffer circuit 836 may temporarily store the codeword CW and may output the cache line data CLDAT included in the codeword CW to the multiplexer 888.

The selection logic 837 may receive the syndrome SDR from the syndrome calculator 831 and may provide the multiplexer 888 with a selection signal sel for selecting one of the cache line data CLDAT and the corrected data C_DAT.

In response to the selection signal sel, the multiplexer 888 may output one of the cache line data CLDAT and the corrected data C_DAT as a result of RS decoding.

Figure 14:
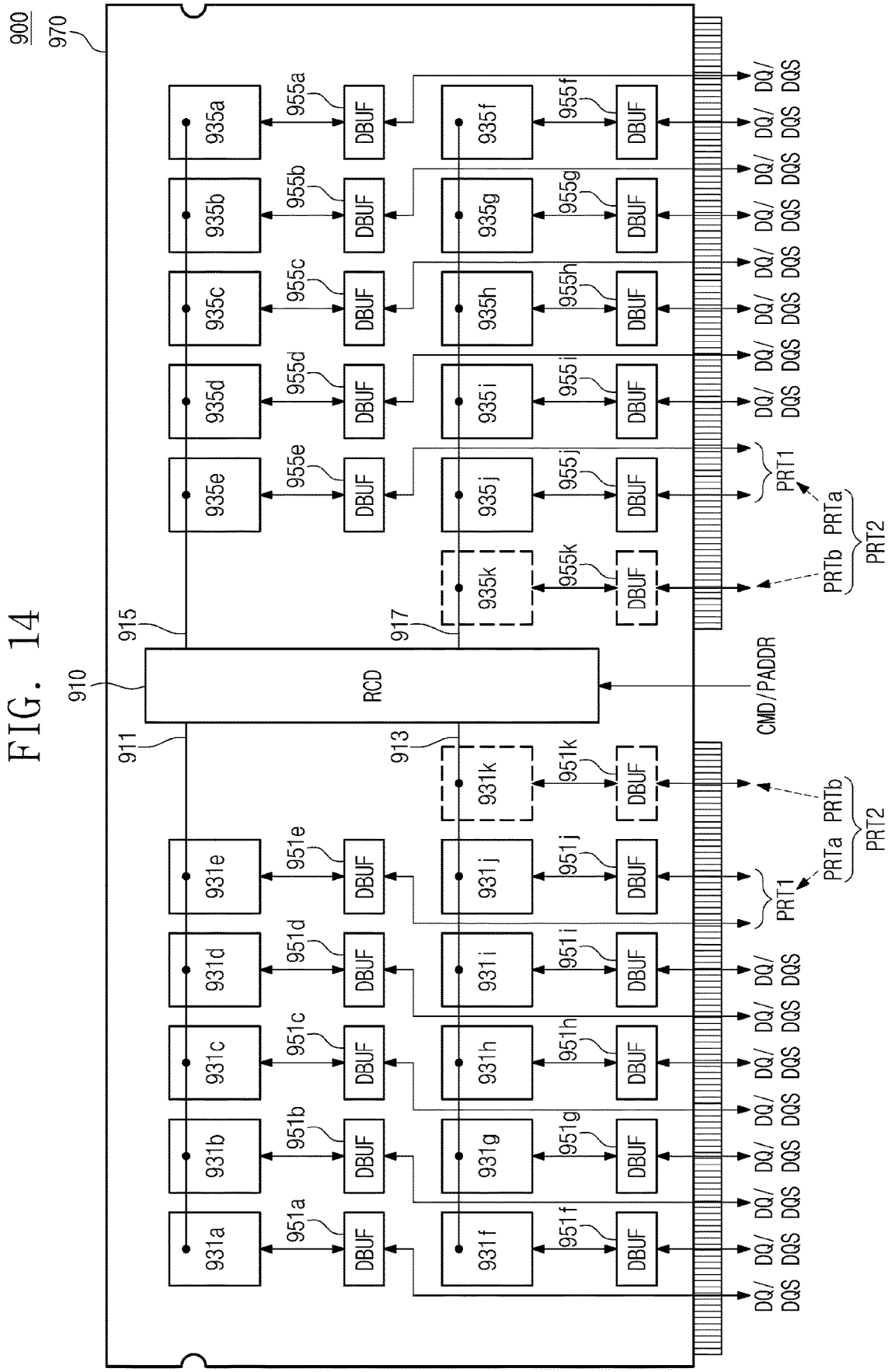
FIG. 14 is a diagram for describing storage regions for storing cache line data and parity symbols of FIG. 1.

FIG. 14 is a diagram for describing storage regions for storing cache line data and parity symbols of FIG. 1.

A memory module 900 in which the plurality of volatile memory devices 250 of FIG. 1 are implemented is illustrated in FIG. 14. The memory module 900 may include a register clock driver (RCD) 910, a plurality of volatile memory devices 931a, 931b, 931c, 931d, 931e, 931f, 931g, 931h, 931i, 931j, 931k, 935a, 935b, 935c, 935d, 935e, 935f, 935g, 935h, 935i, 935j, and 935k, and a plurality of data buffers 951a, 951b, 951c, 951d, 951e, 951f, 951g, 951h, 951i, 951j, 951k, 955a, 955b, 955c, 955d, 955e, 955f, 955g, 955h, 955i, 955j, and 955k, which are disposed on a circuit board 970. The volatile memory devices 931, 935, are connected with RCD 910 via lines 911, 913, 915 and 917 (see FIG. 14).

In an embodiment, the volatile memory devices 931a to 931k may constitute a first memory rank of the memory module 900, and the volatile memory devices 935a to 935k may constitute a second memory rank of the memory module 900.

The register clock driver 910 may control the plurality of volatile memory devices 931a to 931k and 935a to 935k under control of a memory controller (e.g., 210 of FIG. 1). For example, the register clock driver 910 may selectively provide the command CMD, the physical address PADDR, and a codeword received from the memory controller to volatile memory devices constituting one of the first memory rank and the second memory rank.

As described with reference to FIG. 1, the plurality of volatile memory devices (e.g., 250 of FIG. 1) may include first to third storage regions (e.g., 251, 253, and 255 of FIG. 1). In an embodiment, the first to third storage regions may be defined for each of the first memory rank and the second memory rank. For example, in the volatile memory devices 931a to 931k constituting the first memory rank, the volatile memory devices 931a to 931d and 931f to 931i may constitute the first storage region, the volatile memory devices 931e and 931j may constitute the second storage region, and the volatile memory device 931k may constitute the third storage region.

In an embodiment, the volatile memory devices 931a to 931d and 931f to 931i may transmit/receive cache line data through the data buffers 951a to 951d and 951f to 951i; the volatile memory devices 931e and 931j may transmit/receive the first parity symbols PRT1 or a part PRTa of the second parity symbols PRT2 through the data buffers 951e and 951j; the volatile memory device 931k may transmit/receive a part (e.g., PRTb) of the second parity symbols PRT2 through the data buffer 951k.

In an embodiment, the configuration and operation of the volatile memory devices constituting the second memory rank may be identical or similar to those of the volatile memory devices constituting the first memory rank.

Figure 15A:
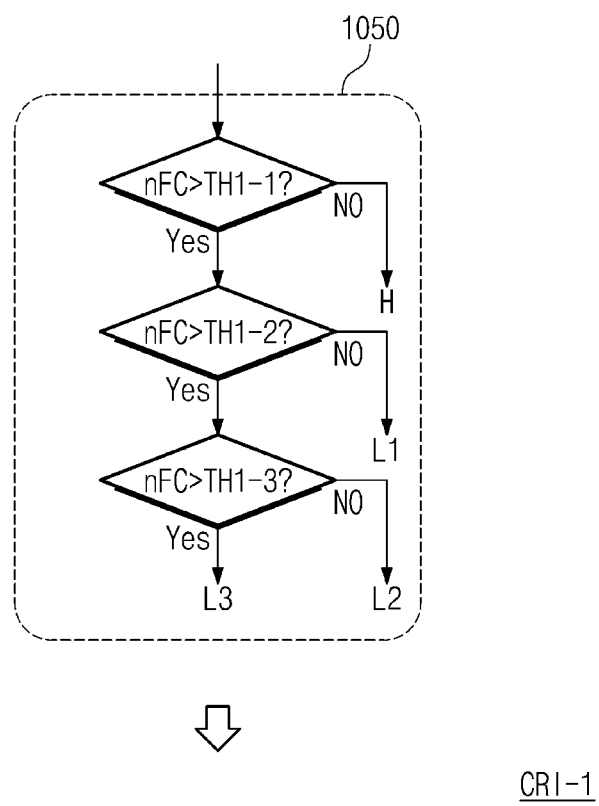

FIGS. 15A and 15B are diagrams for describing an embodiment of the process of determining an error correction level, which is described with reference to FIGS. 1 and 2.

Referring to FIG. 15A, an ECL manager may determine the degree of cell reliability DCR of target memory cells as one of a plurality of cell reliability levels H, L1, L2, and L3, based on a plurality of threshold values TH1-1, TH1-2, and TH1-3 and the number of fail cells nFC of the target memory cells included in a storage region where cache line data are to be written, and the degree of cell reliability DCR may be identified by a cache line index (CRI-1). In an embodiment, a determination operation 1050 illustrated in FIG. 15A may be another embodiment of the determination operation 550 described with reference to FIG. 6C.

For example, when the number of fail cells nFC is greater than the (1-1)-th threshold value TH1-1 and when the number of fail cells nFC is smaller than the (1-2)-th threshold value TH1-2, the ECL manager may determine the degree of cell reliability DCR of the target memory cells as a (1-1)-th cell reliability level (e.g., L1) among the plurality of cell reliability levels H, L1, L2, and L3.

For example, when the number of fail cells nFC is greater than the (1-1)-th threshold value TH1-1 and the (1-2)-th threshold value TH1-2 and when the number of fail cells nFC is smaller than the (1-3)-th threshold value TH1-3, the ECL manager may determine the degree of cell reliability DCR of the target memory cells as a (1-2)-th cell reliability level (e.g., L2) among the plurality of cell reliability levels H, L1, L2, and L3.

For example, when the number of fail cells nFC is greater than the (1-1)-th threshold value TH1-1, the (1-2)-th threshold value TH1-2, and the (1-3)-th threshold value TH1-3, the ECL manager may determine the degree of cell reliability DCR of the target memory cells as a (1-3)-th cell reliability level (e.g., L3) among the plurality of cell reliability levels H, L1, L2, and L3.

For example, when the number of fail cells nFC is smaller than or equal to the (1-1)-th threshold value TH1-1, the ECL manager may determine the degree of cell reliability DCR of the target memory cells as a second cell reliability level (e.g., "H") among the plurality of cell reliability levels H, L1, L2, and L3.

For example, the ECL manager may initialize the degree of cell reliability associated with each of one or more cache line indexes (e.g., CCL1, CCL2, CCL3, etc.) to the second cell reliability level. The ECL manager may change the degree of cell reliability associated with a cache line index (e.g., CCL1) from the second cell reliability level to the (1-1)-th cell reliability level. The ECL manager may sequentially change the degree of cell reliability associated with a cache line index (e.g., CCL2) from the second cell reliability level to the (1-1)-th cell reliability level, the (1-2)-th cell reliability level, and the (1-3)-th cell reliability level. The ECL manager may sequentially change the degree of cell reliability associated with a cache line index (e.g., CCL3) from the second cell reliability level to the (1-1)-th cell reliability level and the (1-2)-th cell reliability level.

Referring to FIG. 15B, error correction level information ECLI-4 may include the degree of cell reliability DCR and ECC control signal ECTL and may further include the number of parity symbols and the number of correctable error symbols.

In an embodiment, when the degree of cell reliability DCR has the (1-3)-th cell reliability level, the error correction level information ECLI-4 may be set such that the ECC control signal ECTL indicates a fourth correction level CL3; when the degree of cell reliability DCR has the (1-2)-th cell reliability level, the error correction level information ECLI-4 may be set such that the ECC control signal ECTL indicates a third correction level CL3. When the degree of cell reliability DCR has the (1-2)-th cell reliability level, the error correction level information ECLI-4 may be set such that the ECC control signal ECTL indicates the second correction level CL2; when the degree of cell reliability DCR has the second cell reliability level, the error correction level information ECLI-4 may be set such that the ECC control signal ECTL indicates the first correction level CL1. In this case, the first to fourth correction levels CL1, CL2, CL3, and CL4 may respectively provide error correction capabilities of different levels, the fourth correction level CL4 may provide the error correction capability of the highest level, and the first correction level CL1 may provide the error correction capability of the lowest level.

For example, when the ECC control signal ECTL indicates the first correction level CL1, the ECL manager may allow an ECC engine to generate parity symbols, the first number of which corresponds to the first value "p"; when the ECC control signal ECTL indicates the second correction level CL2, the ECL manager may allow the ECC engine to generate parity symbols, the second number of which corresponds to the second value "q" greater than the first value "p". When the ECC control signal ECTL indicates the third correction level CL3, the ECL manager may allow an ECC engine to generate parity symbols, the third number of which corresponds to a third value "r" (r being an integer greater than "0") greater than the second value "q"; when the ECC control signal ECTL indicates the fourth correction level CL4, the ECL manager may allow the ECC engine to generate parity symbols, the fourth number of which corresponds to a fourth value "s" (s being an integer greater than "0") greater than the third value "r".

For example, in the process of performing RS decoding, "p" parity symbols may be for correcting "L" error symbols, and "q" parity symbols may be for correcting "M" error symbols. Herein, "M" may be greater than "L". For example, "r" parity symbols may be for correcting "N" error symbols (N being an integer greater than M), and "s" parity symbols may be for correcting "O" error symbols (O being a greater than "N").

An embodiment in which the memory system according to an embodiment of the present disclosure provides error correction capabilities of different levels based on determining the degree of cell reliability DCR of target memory cells as one of three or more cell reliability levels (e.g., H, L1, L2, and L3), but the present disclosure is not limited thereto. As in the above degree of cell reliability DCR, the memory system according to an embodiment of the present disclosure provides error correction capabilities of different levels based on determining the degree of data integrity described with reference to FIGS. 11A and 11B as one of three or more cell reliability levels.

FIG. 16 is a diagram illustrating an example of generation matrices and check matrices used in an ECC engine of FIG. 4.

Referring to FIG. 16, ECC information ECCI may include two or more generation matrices and two or more check matrices. For example, the ECC information ECCI may include generation matrices GMTRXa, GMTRXb, GMTRXc, GMTRXd, GMTRXe, and GMTRXf and check matrices CMTRXa, CMTRXb, CMTRXc, CMTRXd, CMTRXe, and CMTRXf.

The generation matrices GMTRXa to GMTRXf may respectively correspond to the correction levels CL1 to CL6 that an ECC control signal indicates, and the check matrices CMTRXa to CMTRXf may respectively correspond to the correction levels CL1 to CL6.

Two of the generation matrices GMTRXa to GMTRXf may be provided to an ECC encoder in the RS encoding process corresponding to FIGS. 6E, 7E, and 11B, and two of the check matrices CMTRXa to CMTRXf may be provided to an ECC decoder in the RS decoding process corresponding thereto.

Four of the generation matrices GMTRXa to GMTRXf may be provided to an ECC encoder in the RS encoding process corresponding to FIG. 15B, and four of the check matrices CMTRXa to CMTRXf may be provided to an ECC decoder in the RS decoding process corresponding thereto.

FIG. 17 is a diagram for describing another example of cell reliability information of FIGS. 6D and 15A.

Referring to FIG. 17, cell reliability information CRI-2 may include a cache line index, the degree of cell reliability DCR of target memory cells, and a cell error location CEL. In an embodiment, the cell reliability information CRI-2 may further include the cell error location CEL compared to the cell reliability information CRI of FIG. 6D and the cell reliability information CRI-1 of FIG. 15A. The cell error location CEL may indicate a location of fail cells included in target memory cells associated with cache line data in detail.

Figure 18:
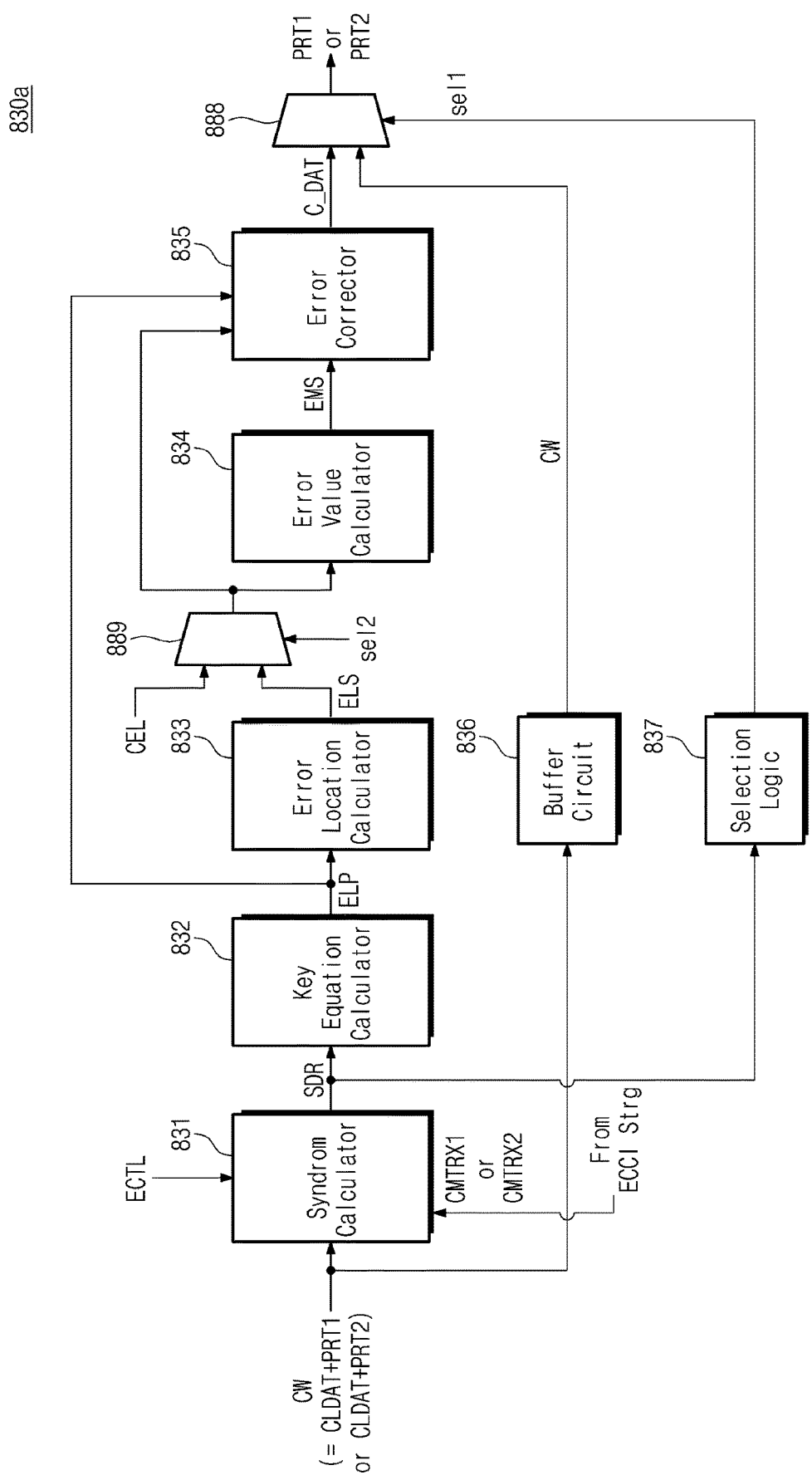
FIG. 18 is a block diagram illustrating an embodiment of an ECC decoder of FIG. 4, which uses a cell error location of FIG. 17.

FIG. 18 is a block diagram illustrating an embodiment of an ECC decoder of FIG. 4, which uses a cell error location of FIG. 17.

Referring to FIG. 18, an ECC decoder 830a may correspond to the ECC decoder 353 of FIG. 4 and may further include a multiplexer 889 compared to the ECC decoder 830 of FIG. 13.

The multiplexer 889 may receive the error symbol locations ELS from the error location calculator 833 and may receive the cell error location CEL included in the cell reliability information CRI-2 of FIG. 17 from an ECL manager.

The multiplexer 889 may output either the error symbol locations ELS or the cell error location CEL to the error value calculator 834 and the error corrector 835 based on a selection signal sel2, and the selection signal sel2 may output either the error symbol locations ELS or the cell error location CEL based on whether the cell error location CEL is included in cell reliability information.

In an embodiment, when it is possible to determine a location of fail cells included in target memory cells in detail based on the cell error location CEL, the performance of RS decoding may be improved.

Figure 19:
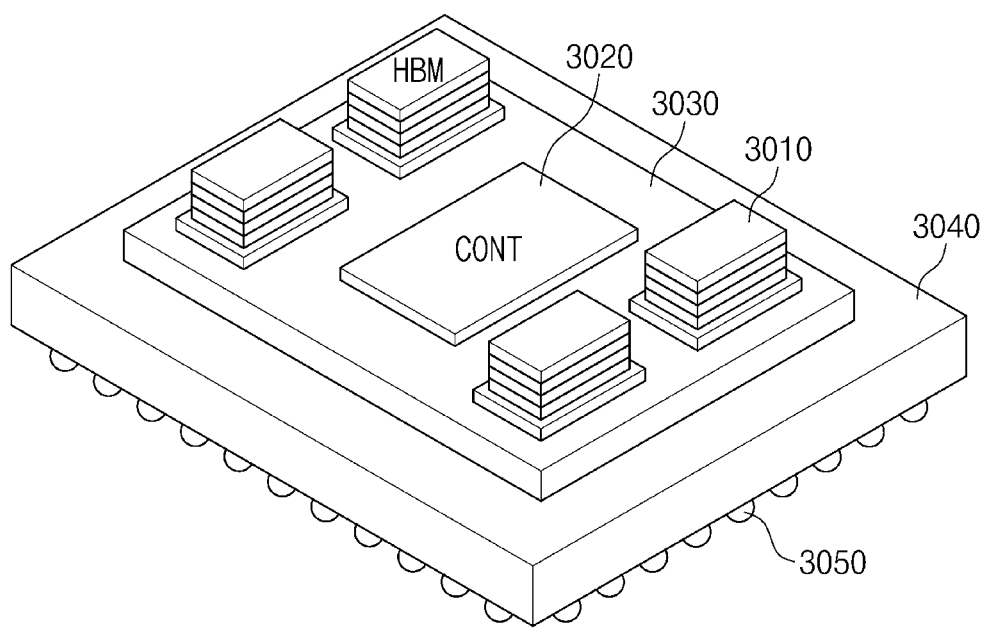
FIG. 19 is a diagram illustrating an example of a structure of a semiconductor package including a memory system according to an embodiment of the present disclosure.

FIG. 19 is a diagram illustrating an example of a structure of a semiconductor package including a memory system according to an embodiment of the present disclosure.

Referring to FIG. 19, a semiconductor package 3000 may include one or more stack-type memory devices 3010 and a memory controller 3020. The stack-type memory device 3010 and the memory controller 3020 may be mounted on an interposer 3030, and the interposer 3030 on which the stack-type memory device 3010 and the memory controller 3020 are mounted may be mounted on a package substrate 3040. The memory controller 3020 may correspond to a semiconductor device capable of controlling a function of the stack-type memory device 3010. For example, the memory controller 3020 may be implemented with an application processor (AP).

The stack-type memory device 3010 may be implemented in various shapes. According to an embodiment, the stack-type memory device 3010 may be a memory device that is implemented in the shape of a high bandwidth memory where a plurality of layers are stacked. Accordingly, the stack-type memory device 3010 may include a buffer die and a plurality of memory dies, and one or more of the plurality of memory dies may include a memory controller (e.g., 210 of FIG. 1 or 300 of FIG. 4), and the memory controller may include an ECL manager (e.g., 213 of FIG. 1 or 330 of FIG. 4) and an ECC engine (e.g., 215 of FIG. 1 or 350 of FIG. 4).

In the process of performing RS encoding, the ECC engine may generate one of first parity symbols and second parity symbols based on a correction level indicated by an ECC control signal; in the process of performing RS decoding, the ECC engine may decode a codeword by using either the first parity symbols or the second parity symbols.

A plurality of stack-type memory devices 3010 may be mounted on the interposer 3030, and the memory controller 3020 may communicate with the plurality of stack-type memory devices 3010. Herein, the interposer 3030 may include a TSV-type or PCB-type organic or a non-TSV-type embedded multi-die interconnect bridge (EMIB).

Figure 20:
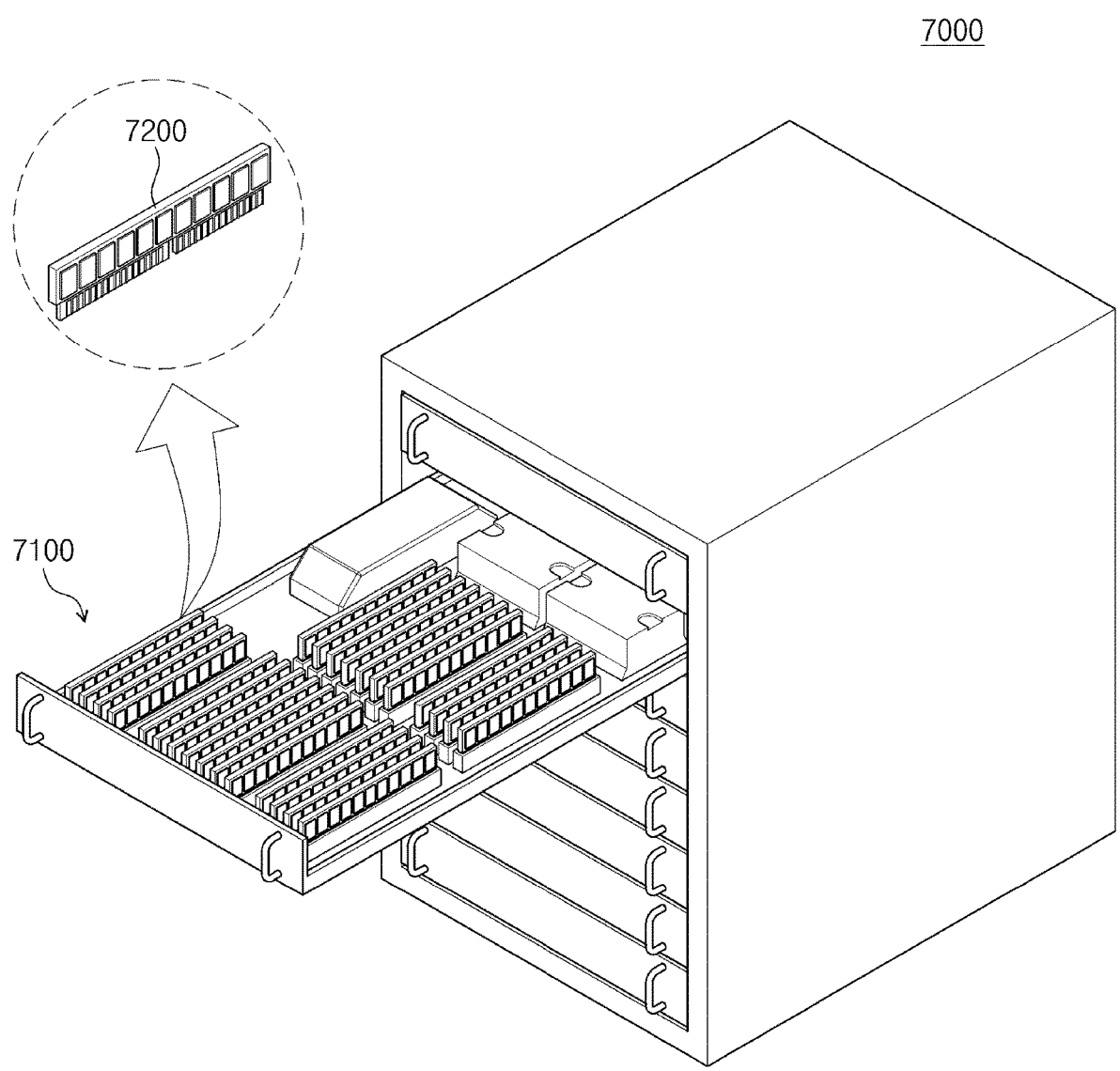
FIG. 20 is a conceptual diagram illustrating a server system including a memory system according to an embodiment of the present disclosure.

FIG. 20 is a conceptual diagram illustrating a server system including a memory system according to an embodiment of the present disclosure.

Referring to FIG. 20, a server system 7000 may include a plurality of server racks. One 7100 of the plurality of server racks is illustrated in FIG. 20 as an example.

Each of the plurality of server racks may include one or more memory systems. For example, the server rack 7100 may include one or more memory systems. The one or more memory systems may be implemented with one of the memory systems according to embodiments of the present disclosure, which are described above. One or more memory modules 7200 included in the server rack 7100 is illustrated in FIG. 20.

The server rack 7100 may further include a processor, an ECL manager, and an ECC engine of FIG. 1, as well as the memory module 7200. The one or more memory systems may be connected to at least one processor included in the server rack 7100 without a chipset. For example, a memory system may be a nonvolatile memory module implemented in the shape of a dual in-line memory module (DIMM). In this example, the one or more memory systems may be electrically connected to a DIMM socket electrically connected to the processor and may communicate with the processor. As an example, memory systems may communicate with a memory controller in compliance with the interface protocol that is defined in the DIMM specification and supports the DDR scheme, and the server system 7000 including the memory systems may communicate with an external host device through the CXL interface.

As described above, a memory system according to embodiments of the present disclosure may communicate with a host device based on a preset communication scheme and may set an allowable decoding time range based on the communication scheme. The allowable decoding time range may be longer than a time that is permitted in a conventional electronic system for codeword decoding, and the memory system may provide the error correction capability of "chip-kill+multi-symbol" or more by performing Reed-Solomon (RS) decoding providing the capability to correct an error(s) of multi-symbols within the allowable decoding time range. The memory system may variously generate parity symbols for RS encoding or RS decoding based on one or more of cell reliability information and data reliability request information. The memory system may provide the error correction capability capable of efficiently correcting an error by using parity symbols while maintaining the performance of a plurality of volatile memory devices.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A memory system comprising:
a plurality of volatile memory devices; and
a memory controller configured to control the plurality of volatile memory devices,
wherein the memory controller comprises:
a host interface configured to communicate with a host device based on an interconnection communication protocol;
an error correction level (ECL) manager configured to:
receive cache line data from the host device through the host interface, and
output an error correction code (ECC) control signal indicating one of a first correction level and a second correction level being error correction levels based on cell reliability information and data reliability request information which are associated with the cache line data; and
an ECC engine configured to:
based on the ECC control signal indicating the first correction level, generate first parity symbols associated with the cache line data, and
based on the ECC control signal indicating the second correction level, generate additional parity symbols.

2. The memory system of claim 1, wherein the cell reliability information comprises the cache line data, and a degree of cell reliability associated with target memory cells included in the plurality of volatile memory devices, and
wherein the data reliability request information comprises a degree of data integrity associated with the cache line data, and the degree of data integrity is a data reliability requested by the host device.

3. The memory system of claim 2, wherein the ECL manager is further configured to determine needed error correction levels based on at least one of the cell reliability information and the data reliability request information.

4. The memory system of claim 2, wherein the ECL manager is further configured to determine the degree of cell reliability associated with the target memory cells as one of a plurality of cell reliability levels based on a number of fail cells included in the target memory cells and at least one threshold value.

5. The memory system of claim 4, wherein the ECL manager is further configured to:
based on the number of fail cells being greater than a first threshold value, determine the degree of cell reliability associated with the target memory cells as a first cell reliability level of the plurality of cell reliability levels, and
based on the number of fail cells being smaller than or equal than the first threshold value, determine the degree of cell reliability associated with the target memory cells as a second cell reliability level of the plurality of cell reliability levels.

6. The memory system of claim 5, wherein the ECL manager is further configured to:
based on the degree of cell reliability associated with the target memory cells being determined as the second cell reliability level, allow the ECC engine to generate the first parity symbols, a first number of first parity symbols corresponding to a first value, and
based on the degree of cell reliability of the target memory cells being determined as the first cell reliability level, allow the ECC engine to generate second parity symbols, a second number of the second parity symbols corresponding to a second value greater than the first value.

7. The memory system of claim 4, wherein the ECL manager is further configured to:
initialize the degree of cell reliability associated with the target memory cells, and
monitor the number of fail cells based on a result of performing decoding on a codeword associated with the cache line data.

8. The memory system of claim 2, wherein the degree of cell reliability comprises a cache line index being an address of a region where the cache line data are temporarily stored in a cache memory of the host device, a cell reliability level corresponding to the cache line index and indicating the degree of cell reliability associated with the target memory cells, and a cell error location indicating a location of fail cells included in the target memory cells.

9. The memory system of claim 2, wherein the ECL manager is further configured to determine the degree of data integrity as one of a plurality of data reliability request levels based on an integrity value indicated by an integrity indicator included in a host request corresponding to the cache line data and at least one threshold value.

10. The memory system of claim 9, wherein the ECL manager is further configured to:
based on the integrity value being smaller than or equal to a second threshold value, determine the degree of data integrity as a first data reliability request level among the plurality of data reliability request levels, and
based on the integrity value being greater than the second threshold value, determine the degree of data integrity as a second data reliability request level among the plurality of data reliability request levels.

11. The memory system of claim 10, wherein the ECL manager is further configured to:
based on the degree of data integrity being determined as the first data reliability request level, allow the ECC engine to generate the first parity symbols, a first number of which corresponds to a first value, and
based on the degree of data integrity being determined as the second data reliability request level, allow the ECC engine to generate second parity symbols, a second number of which corresponds to a second value greater than the first value.

12. The memory system of claim 1, wherein the ECL manager is further configured to, based on a number of fail cells included in target memory cells associated with the cache line data being greater than a first threshold value and an integrity value indicated by an integrity indicator included in a host request corresponding to the cache line data being greater than a second threshold value, output the ECC control signal indicating the second correction level.

13. The memory system of claim 12, wherein the ECL manager is further configured to, based on the number of fail cells being smaller than or equal to the first threshold value or the integrity value being smaller than or equal to the second threshold value, output the ECC control signal indicating the first correction level.

14. The memory system of claim 1, wherein the ECC engine is further configured to correct M error symbols by decoding a codeword associated with the cache line data based on second parity symbols including the first parity symbols and the additional parity symbols, and
wherein M an integer greater than 1 and is determined based on an allowable decoding time range configurable by the interconnection communication protocol.

15. The memory system of claim 1, wherein the ECC engine comprises:
an ECC encoder configured to encode the cache line data to output a codeword;
an ECC decoder configured to decode the codeword to output decoded data; and
an ECC information storage unit configured to provide at least one generation matrix to the ECC encoder and the ECC decoder for the encoding and the decoding, and
wherein the ECC decoder comprises a multiplexer configured to provide an error value calculator with one of a cell error location indicating a location of fail cells included in target memory cells associated with the cache line data and an error symbol location generated based on the codeword, based on a selection signal.

16. A method of operating a memory system, the method comprising:
receiving cache line data from a host device based on an interconnection communication protocol;
determining an error correction level associated with the cache line data based on at least one of cell reliability information and data reliability request information which are associated with the cache line data;
based on the error correction level indicating a first correction level, generating first parity symbols associated with the cache line data;
based on the error correction level indicating a second correction level, generating second parity symbols including additional parity symbols; and
writing a codeword comprising the cache line data and either the first parity symbols or the second parity symbols in a plurality of volatile memory devices.

17. The method of claim 16, wherein the cell reliability information comprises the cache line data, and a degree of cell reliability associated with target memory cells included in the plurality of volatile memory devices, and
wherein the data reliability request information comprises a degree of data integrity associated with the cache line data, and the degree of data integrity is a data reliability requested by the host device.

18. The method of claim 16, wherein the writing the codeword in the plurality of volatile memory devices comprises:
based on the error correction level indicating the first correction level, writing the cache line data in a first storage region of the plurality of volatile memory devices; and
based on the error correction level indicating the second correction level, writing the first parity symbols in a second storage region of the plurality of volatile memory devices.

19. The method of claim 18, wherein the writing the codeword in the plurality of volatile memory devices further comprises, based on the error correction level indicating the second correction level, writing the additional parity symbols in a third storage region of the plurality of volatile memory devices.

20. An electronic system comprising:
a host device; and
a memory system including a plurality of volatile memory devices and a memory controller configured to control the plurality of volatile memory devices and communicate with the host device based on an interconnection communication protocol,
wherein the memory controller is configured to:
receive cache line data from the host device through an interconnection interface,
determine an error correction level associated with the cache line data based on at least one of cell reliability information and data reliability request information,
based on the error correction level indicating a first correction level, generate first parity symbols associated with the cache line data, write the cache line data in a first storage region, and write the first parity symbols in a second storage region, and
based on the error correction level indicating a second correction level, generate additional parity symbols, write the cache line data in the first storage region, write the first parity symbols in the second storage region, and write the additional parity symbols in a third storage region.

* * * * *